US012612889B2

(12) United States Patent
French, Sr.

(10) Patent No.: US 12,612,889 B2
(45) Date of Patent: Apr. 28, 2026

(54) MODULAR HYDROPOWER SYSTEMS AND METHODS WITH PUMPED STORAGE

(71) Applicant: W.L. French Hydropower Holdings LLC, Chelmsford, MA (US)

(72) Inventor: William L. French, Sr., Lexington, MA (US)

(73) Assignee: W.L. FRENCH HYDROPOWER HOLDINGS LLC, Chelmsford, MA (US)

( * ) Notice: Subject to any disclaimer, the term of this patent is extended or adjusted under 35 U.S.C. 154(b) by 0 days.

(21) Appl. No.: 18/924,991

(22) Filed: Oct. 23, 2024

(65) Prior Publication Data

US 2025/0257707 A1 Aug. 14, 2025

Related U.S. Application Data

(60) Provisional application No. 63/701,484, filed on Sep. 30, 2024, provisional application No. 63/552,655, filed on Feb. 12, 2024, provisional application No. 63/552,088, filed on Feb. 9, 2024.

(51) Int. Cl.
*F03B 13/08* (2006.01)
*F03B 13/06* (2006.01)

(52) U.S. Cl.
CPC .............. *F03B 13/06* (2013.01); *F03B 13/08* (2013.01)

(58) Field of Classification Search
CPC ........... F03B 13/08; F03B 13/06; Y02E 10/20
See application file for complete search history.

(56) References Cited

U.S. PATENT DOCUMENTS

| | | | |
|---|---|---|---|
| 198,939 | A | 1/1878 | Herron |
| 838,587 | A | 12/1906 | Von |
| 840,110 | A | 1/1907 | Coburn |
| 853,146 | A | 5/1907 | Gerstenbergk-Zeck |
| 870,866 | A | 11/1907 | Church |
| 946,585 | A | 1/1910 | Smith |
| 1,314,743 | A | 9/1919 | Groat |
| 1,594,578 | A | 8/1926 | Thurlow |
| 1,628,933 | A | 5/1927 | Troiel |
| 1,898,095 | A | 2/1933 | Noetzli |
| 2,138,070 | A | 11/1938 | Harrison et al. |
| 2,138,071 | A | 11/1938 | Harrison et al. |
| 2,515,059 | A | 7/1950 | William |

(Continued)

FOREIGN PATENT DOCUMENTS

| | | | |
|---|---|---|---|
| BR | 112015022633 | A2 | 7/2017 |
| CN | 105484930 | A | 4/2016 |

(Continued)

OTHER PUBLICATIONS

Chaudhari et al.; "A Study of Dynamic Response of Circular Water Tank with Baffle Walls"; Aug. 2017; International Research Journal of Engineering and Technology; All (Year: 2017).

(Continued)

*Primary Examiner* — Carib A Oquendo
(74) *Attorney, Agent, or Firm* — Hamilton, Brook, Smith & Reynolds, P.C.

(57) ABSTRACT

A power generation system may include an impoundment structure at least partially defined by a plurality of precast segments. At least one of the precast segments may include a precast form and at least one precast infill block.

15 Claims, 36 Drawing Sheets

Precast Powerhouse in Excavated Cavern

(56) References Cited

U.S. PATENT DOCUMENTS

| | | | | |
|---|---|---|---|---|
| 2,566,748 | A | 9/1951 | Hall | |
| 2,961,731 | A | 11/1960 | Buzzell et al. | |
| 2,962,599 | A | 11/1960 | Pirkey | |
| 3,342,033 | A | 9/1967 | Crouch et al. | |
| 3,629,985 | A | 12/1971 | Ueno | |
| 4,023,590 | A | 5/1977 | Harris et al. | |
| 4,031,676 | A | 6/1977 | Dally | |
| 4,109,160 | A | 8/1978 | Goto et al. | |
| 4,132,901 | A | 1/1979 | Crausbay | |
| 4,182,123 | A | 1/1980 | Ueda | |
| 4,260,286 | A | 4/1981 | Buchanan | |
| 4,290,246 | A | 9/1981 | Hilsey | |
| 4,307,299 | A | 12/1981 | Norton | |
| 4,319,142 | A | 3/1982 | Mayo, Jr. | |
| 4,437,017 | A | 3/1984 | Oesterberg | |
| 4,468,153 | A | 8/1984 | Gutierrez | |
| 4,493,587 | A | 1/1985 | Ferrari | |
| 4,569,200 | A | 2/1986 | Lamb | |
| 4,573,827 | A * | 3/1986 | Mayo, Jr. ................ | F03B 13/08 290/43 |
| 4,740,105 | A | 4/1988 | Wollander | |
| 4,772,157 | A | 9/1988 | Obermeyer | |
| 4,804,855 | A | 2/1989 | Obermeyer | |
| 4,941,771 | A | 7/1990 | Perper | |
| 4,998,846 | A | 3/1991 | Evstratov et al. | |
| 5,087,150 | A | 2/1992 | McCreary | |
| 5,161,913 | A | 11/1992 | Boylan | |
| 5,195,846 | A | 3/1993 | Lemperiere | |
| 5,439,316 | A | 8/1995 | Richardson | |
| 5,817,944 | A | 10/1998 | Chung | |
| 6,012,872 | A | 1/2000 | Perry et al. | |
| 6,042,301 | A | 3/2000 | Sovran | |
| 6,155,746 | A | 12/2000 | Peters | |
| 6,243,994 | B1 | 6/2001 | Bernini | |
| 6,273,639 | B1 | 8/2001 | Eikrem et al. | |
| 6,281,597 | B1 | 8/2001 | Obermeyer et al. | |
| 6,652,189 | B2 | 11/2003 | Burns | |
| 6,672,799 | B2 | 1/2004 | Earl | |
| 6,712,555 | B1 | 3/2004 | Truebe et al. | |
| 6,942,423 | B2 | 9/2005 | Davis | |
| 7,029,200 | B1 | 4/2006 | Cravens | |
| 7,153,060 | B1 | 12/2006 | Bennion | |
| 7,214,005 | B1 | 5/2007 | Davis | |
| 7,422,392 | B2 | 9/2008 | Obermeyer | |
| 7,478,974 | B1 | 1/2009 | Kelly | |
| 7,651,298 | B2 | 1/2010 | Boudreaux, Jr. | |
| 7,708,495 | B1 | 5/2010 | Antee | |
| 8,034,238 | B2 | 10/2011 | Ghalib | |
| 8,066,449 | B2 | 11/2011 | Lux, III | |
| 8,128,318 | B1 | 3/2012 | Anderson, Jr. | |
| 8,414,223 | B2 | 4/2013 | French, Sr. | |
| 8,596,909 | B2 | 12/2013 | Wilhelms et al. | |
| 8,845,231 | B2 | 9/2014 | Holstein et al. | |
| 9,034,454 | B1 | 5/2015 | Bowman | |
| 9,103,084 | B2 | 8/2015 | French, Sr. | |
| 9,730,431 | B2 | 8/2017 | French | |
| 9,797,107 | B1 | 10/2017 | Huang | |
| 9,930,744 | B2 | 3/2018 | Sills et al. | |
| 10,760,233 | B2 | 9/2020 | French, Sr. | |
| 11,313,116 | B2 | 4/2022 | Eggleston et al. | |
| 11,708,674 | B2 | 7/2023 | French, Sr. | |
| 12,180,665 | B2 | 12/2024 | French, Sr. | |
| 2002/0018696 | A1 | 2/2002 | Robinson | |
| 2002/0031401 | A1 | 3/2002 | Yang | |
| 2002/0139736 | A1 | 10/2002 | Stever et al. | |
| 2004/0009040 | A1 | 1/2004 | Boylan | |
| 2004/0222641 | A1* | 11/2004 | Panholzer ............... | F03B 13/08 290/43 |
| 2004/0234218 | A1 | 11/2004 | Tao et al. | |
| 2004/0265060 | A1 | 12/2004 | Lee et al. | |
| 2005/0034452 | A1 | 2/2005 | Davis | |
| 2005/0074289 | A1 | 4/2005 | Tucker | |
| 2005/0207844 | A1 | 9/2005 | Boccotti | |
| 2006/0007388 | A1 | 1/2006 | James | |
| 2006/0078388 | A1 | 4/2006 | Obermeyer | |
| 2007/0116522 | A1 | 5/2007 | Boudreaux, Jr. | |
| 2007/0154265 | A1 | 7/2007 | Stauffacher et al. | |
| 2008/0075535 | A1 | 3/2008 | Han | |
| 2008/0089743 | A1 | 4/2008 | Han | |
| 2008/0175667 | A1 | 7/2008 | Liou | |
| 2008/0213045 | A1 | 9/2008 | Tappel | |
| 2008/0240861 | A1 | 10/2008 | Phillips | |
| 2008/0253837 | A1 | 10/2008 | Miller | |
| 2009/0041543 | A1 | 2/2009 | Kroger | |
| 2009/0113910 | A1 | 5/2009 | Shim | |
| 2009/0134623 | A1 | 5/2009 | Krouse | |
| 2009/0293469 | A1 | 12/2009 | Chen | |
| 2009/0322091 | A1 | 12/2009 | Jack | |
| 2010/0045311 | A1 | 2/2010 | Chung | |
| 2010/0074687 | A1 | 3/2010 | Boudreaux, Jr. | |
| 2010/0129156 | A1 | 5/2010 | Taylor | |
| 2010/0139185 | A1 | 6/2010 | Neighbors | |
| 2010/0140934 | A1 | 6/2010 | Nicoson | |
| 2010/0260548 | A1 | 10/2010 | Shipley et al. | |
| 2010/0270811 | A1 | 10/2010 | Angulo et al. | |
| 2011/0089695 | A1* | 4/2011 | Krouse .................. | F03B 13/08 290/52 |
| 2011/0146802 | A1 | 6/2011 | Feher | |
| 2011/0225965 | A1 | 9/2011 | Van et al. | |
| 2012/0009018 | A1 | 1/2012 | Marquis et al. | |
| 2012/0019004 | A1 | 1/2012 | Ekern | |
| 2012/0087733 | A1* | 4/2012 | French, Sr. ............... | E02B 8/06 405/114 |
| 2012/0237298 | A1 | 9/2012 | Cook | |
| 2012/0327592 | A1 | 12/2012 | Godrich et al. | |
| 2013/0236249 | A1 | 9/2013 | Greif et al. | |
| 2013/0266378 | A1 | 10/2013 | French, Sr. | |
| 2014/0053493 | A1 | 2/2014 | Carey | |
| 2014/0088756 | A1 | 3/2014 | Ciuperca | |
| 2014/0183122 | A1 | 7/2014 | Canals et al. | |
| 2014/0197641 | A1* | 7/2014 | Barakat .................. | F03B 13/06 290/54 |
| 2014/0270965 | A1 | 9/2014 | Igel | |
| 2014/0348662 | A1 | 11/2014 | Schibsbye | |
| 2014/0356070 | A1 | 12/2014 | Stromotich | |
| 2015/0056085 | A1 | 2/2015 | Fiske | |
| 2015/0247300 | A1 | 9/2015 | Seo | |
| 2015/0300036 | A1 | 10/2015 | Khoshnevis | |
| 2016/0017558 | A1 | 1/2016 | French, Sr. | |
| 2016/0273512 | A1 | 9/2016 | Nanehkaran | |
| 2016/0286766 | A1 | 10/2016 | French | |
| 2017/0016244 | A1 | 1/2017 | Keller et al. | |
| 2017/0321397 | A1 | 11/2017 | Kent et al. | |
| 2017/0370063 | A1 | 12/2017 | French | |
| 2018/0178977 | A1 | 6/2018 | Crowther et al. | |
| 2018/0291581 | A1* | 10/2018 | Duquette ................ | F03B 15/04 |
| 2018/0298874 | A1 | 10/2018 | Turk | |
| 2019/0186458 | A1 | 6/2019 | Obermeyer et al. | |
| 2019/0256172 | A1 | 8/2019 | Hadjerioua | |
| 2019/0277000 | A1 | 9/2019 | French, Sr. | |
| 2019/0316310 | A1* | 10/2019 | Anders .................. | F03B 13/08 |
| 2020/0011048 | A1 | 1/2020 | Kent et al. | |
| 2020/0370262 | A1 | 11/2020 | Leighton et al. | |
| 2022/0025739 | A1 | 1/2022 | Kloster | |
| 2022/0154416 | A1 | 5/2022 | French, Sr. | |
| 2022/0250723 | A1 | 8/2022 | Hutcheson | |
| 2024/0110350 | A1 | 4/2024 | Vetsch et al. | |
| 2024/0218623 | A1 | 7/2024 | French, Sr. | |
| 2025/0020098 | A1 | 1/2025 | Roberts et al. | |
| 2025/0198105 | A1 | 6/2025 | French, Sr. | |
| 2025/0257538 | A1 | 8/2025 | French | |
| 2025/0257709 | A1 | 8/2025 | French | |
| 2025/0376969 | A1 | 12/2025 | French, Sr. | |

FOREIGN PATENT DOCUMENTS

| | | | |
|---|---|---|---|
| CN | 206052662 | U | 3/2017 |
| CN | 211872914 | U | 11/2020 |
| CN | 112523918 | A | 3/2021 |
| DE | 3029087 | A1 | 2/1981 |
| DE | 3718805 | A1 | 12/1988 |
| DE | 19959116 | A1 | 6/2001 |
| DE | 102015115562 | A1 | 3/2017 |
| EP | 0036453 | B1 | 8/1984 |

(56) References Cited

FOREIGN PATENT DOCUMENTS

| | | | |
|---|---|---|---|
| EP | 0399870 | A1 | 11/1990 |
| EP | 2737203 | B1 | 9/2015 |
| EP | 2971369 | B1 | 8/2023 |
| FR | 2289680 | A1 | 5/1976 |
| FR | 2692298 | A1 | 12/1993 |
| FR | 2865226 | B1 | 4/2007 |
| GB | 2055933 | A | 3/1981 |
| JP | 2005-090208 | A | 4/2005 |
| JP | 3172190 | U | 12/2011 |
| KR | 20-0381909 | Y1 | 4/2005 |
| KR | 10-2006-0025314 | A | 3/2006 |
| KR | 10-0641826 | B1 | 11/2006 |
| KR | 10-2008-0077937 | A | 8/2008 |
| KR | 10-2009-0047190 | A | 5/2009 |
| KR | 10-0994578 | B1 | 11/2010 |
| KR | 10-1008839 | B1 | 1/2011 |
| WO | 2011/133913 | A2 | 10/2011 |
| WO | 2013/019117 | A1 | 2/2013 |
| WO | 2013/089958 | A1 | 6/2013 |
| WO | 2014/158876 | A1 | 10/2014 |
| WO | 2017/066655 | A1 | 4/2017 |
| WO | 2023/084249 | A2 | 5/2023 |

OTHER PUBLICATIONS

Delivering Concrete Segments to the Metro Tunnel—Waking up in Geelong; https://wongm.com/2019/12/melbourne-metro-tunnel-concrete-segments/; Dec. 10, 2019; 11 pages.

DN Tanks, Concrete Tank Services DN Tanks; no date; 7 pages.

Precast Segmental Lining for Underground Tunnels; https://www.nbmcw.com/product-technology/precast/precast-segmental-lining-for-underground-tunnels.html; Oct. 2019; 16 pages.

Solutions for Tunnel Boring Machines; https://can.sika.com/en/construction/shotcrete-tunnelingmining/tunnel-boring-machines.html; no date; 7 pages.

U.S. Department of Energy. (n.d.), "Pumped Storage Hydropower", Accessed Dec. 22, 2022. https://www.energy.gov/eere/water/pumped-storage-hydropower.

* cited by examiner

Powerhouse and Cavern Structure

Any Size Any Shape
NOT TO SCALE

Cavern Excavation

Precast Powerhouse in Excavated Cavern

MODULAR HYDROPOWER SYSTEMS AND METHODS WITH PUMPED STORAGE

RELATED APPLICATIONS

This application claims the benefit of U.S. Provisional Application No. 63/552,088, filed on Feb. 9, 2024. This application claims the benefit of U.S. Provisional Application No. 63/552,655, filed on Feb. 12, 2024. This application claims the benefit of U.S. Provisional Application No. 63/701,484, filed on Sep. 30, 2024. The entire teachings of the above applications are incorporated herein by reference.

BACKGROUND

Pumped storage hydropower systems produce electrical power from the kinetic energy of running water. Pumped storage hydropower systems typically include two water reservoirs, one water reservoir being located at a higher elevation than the other. Power is generated (via a turbine or other power generation components) as water moves from the upper reservoir to the lower reservoir. The system is "recharged" by pumping water from the lower reservoir to the upper reservoir. There is a need for improved hydroelectric power generation systems.

SUMMARY

A power generation system may include an impoundment structure at least partially defined by a plurality of precast segments. At least one of the precast segments may include a precast form and at least one precast infill block.

In some example embodiments, the impoundment structure may define an intake or egress configured to receive or output fluid with a fluid supply via a flow path.

In some example embodiments, the power generation system may further include a power generation module configured to pump fluid from the fluid supply and into the impoundment structure via the flow path.

In some example embodiments, the power generation system may further include a power conversion module configured to convert kinetic energy of fluid released from the impoundment structure and travelling through the flow path into electric energy.

In some example embodiments, the power conversion module may include an intake support structure, a power generator support structure, and a draft support structure. The intake support structure may be configured to support at least one intake tube, the intake tube at least partially defining a flow path. The intake support structure may be at least partially constructed of precast segments. The power generator support structure may be configured to support weight of a power generator in an arrangement operably disposed within the flow path. The power generator support structure may be at least partially constructed of precast segments. The draft support structure may be configured to support at least one draft tube, the at least one draft tube at least partially defining the flow path. The draft support structure may be at least partially constructed of precast segments positioned above the at least one draft tube.

In some example embodiments, the power generation system may further include a flow path structure coupled to the impoundment structure, the flow path structure at least partially defining the flow path. The flow path structure may include at least one precast segment.

In some example embodiments, the precast infill block may be fixedly couped to the precast segment.

A power generation system may include an impoundment structure. The impoundment structure may include a containment wall and at least one inner wall. The containment wall may define at least a portion of a boundary of a containment volume. The containment volume may be configured to store a volume of fluid. The at least one inner wall may be positioned within the containment volume and offset from the containment wall. The at least one inner wall may define at least one aperture.

In some example embodiments, the impoundment structure may include at least one precast segment. The at least one precast segment may include a precast form and at least one precast infill block.

In some example embodiments, the power generation system may further include one or more supports coupling the containment wall with the inner wall.

In some example embodiments, one or more of the one or more supports may define at least one aperture configured to allow fluid to pass therethrough.

In some example embodiments, the power generation system may further include at least one energy dissipation element disposed within the impoundment structure. The at least one energy dissipation element may be configured to redirect the flow of the pumped fluid entering the-impoundment structure.

In some example embodiments, the at least one energy dissipation element disposed within the impoundment structure may cause the flow of the pumped fluid to be redirected to be in a circulating direction between inner wall and outer wall.

In some example embodiments, the containment wall or the at least one inner wall may be at least partially defined by a plurality of precast segments.

In some example embodiments, at least a subset of the plurality of precast segments may be interconnected via complementary coupling elements.

A power generation system may include a powerhouse. The powerhouse may include an intake support structure, a power generator, and a draft support structure. The intake support structure may be configured to support at least one intake tube, the intake tube at least partially defining a flow path. The intake support structure may be at least partially constructed of precast segments.

The power generator support structure may be configured to support weight of a power generator in an arrangement operably disposed within the flow path. The power generator support structure may be at least partially constructed of precast segments. The draft support structure may be configured to support at least one draft tube, the at least one draft tube at least partially defining the flow path. The draft support structure may be at least partially constructed of precast segments positioned above the at least one draft tube.

In some example embodiments, the at least one precast segment may include a precast form and at least one precast infill block.

The power generation system may further include a stabilization system. The stabilization system may include at least one support structure configured to be positioned below a lower surface of the powerhouse; and an attachment mechanism configured to couple the at least one support structure with the powerhouse.

A power generation system may include a water intake structure configured to intake fluid and configured for fluid communication with a powerhouse via a flow path. The water intake structure may be at least partially constructed of precast segments.

The power generation system may further include a flow path structure configured to facilitate fluid communication between the water intake structure and the powerhouse. A first end of the flow path structure may be coupled to the water intake structure and a second end of the flow path structure may be coupled to the powerhouse.

In some example embodiments, the water intake structure may include one or more layers. Each layer may include one or more precast segment.

In some example embodiments, each layer may include at least one protrusion.

In some example embodiments, at least one of the precast segments may include a precast form and a precast infill block.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3B shows a perspective sectional view of an example embodiment of an intake module.

DETAILED DESCRIPTION

Figure 1A:
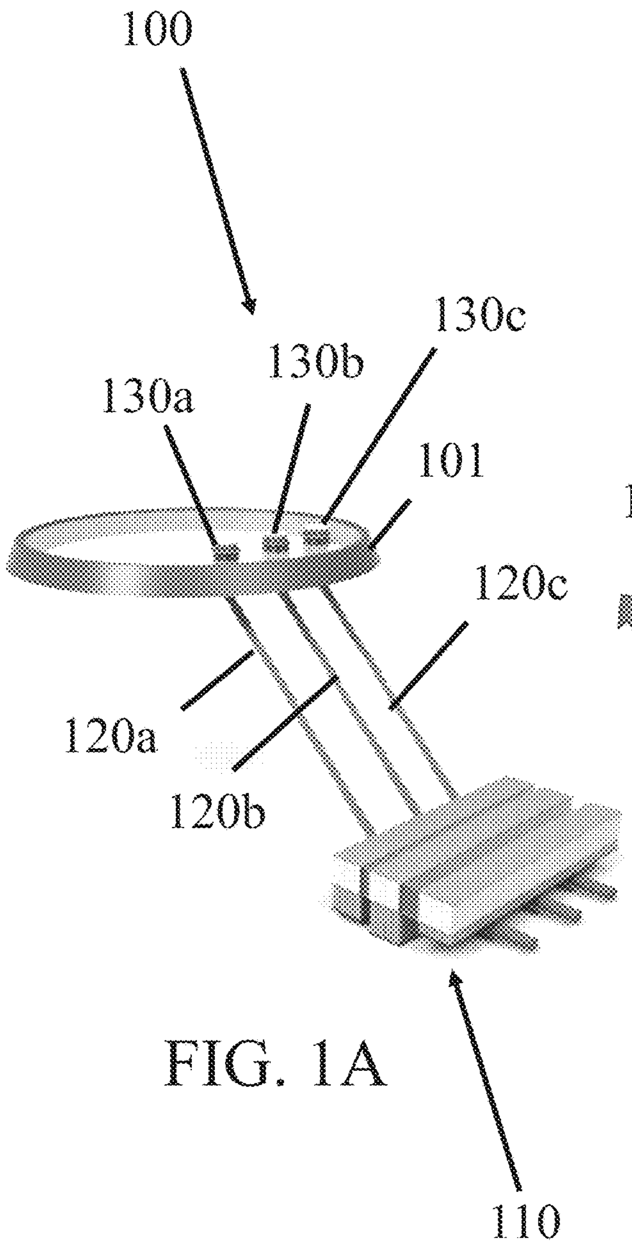
FIG. 1A shows a schematic of an example embodiment of a pump storage system.

A description of example embodiments follows.

Traditional pumped storage facilities typically require complex custom civil designs that are expensive to build, especially in remote mountainous areas. Blasting, excavating, embankment building, and rock-tunneling are examples of costly and time-consuming civil construction activities typically involved in building traditional pumped storage facilities, and these activities leave permanent environmental scars on the landscape. Accordingly, there is a need for improved pumped storage systems.

Systems, devices and methods described herein may involve pumped storage hydropower (PSH) systems that include components constructed from precast segments. As used herein, the term "precast segment" refers to precast modules of particular shape and size formed of a structural material, such as, concrete. Precast segments can include coupling elements to enable the segments to be interconnected during construction of a structure, such as a reservoir or impoundment module. Precast segments can be manufactured off-site, providing for increased control over manufacturing conditions, thereby providing for more robust and uniformly constructed segments for forming a structure, as compared with a structure formed by on-site concrete pouring. For some construction projects, a temporary facility may be constructed to manufacture precast segments on-site, whereby the temporary facility itself may be formed of precast segments.

Hydroelectric power generation systems described herein can provide for more versatile and facile construction than existing hydroelectric power systems, and with less environmental impact. Such systems can be constructed with precast segments, which can provide for faster construction with more robust structural components, and which can provide for construction in areas that would otherwise be inaccessible or that would require more environmentally-destructive construction.

In various embodiments, a power generation system may include a reservoir or impoundment structure that is at least partially defined by a plurality of precast segments. At least a subset of the precast segments may be interconnected via complementary coupling elements. The reservoir or impoundment structure may be elevated with respect to a fluid supply. The system may further include a flow path providing fluid communication between the reservoir or impoundment structure and the fluid supply, a power generation module configured to pump fluid from the fluid supply and into the reservoir via the flow path, and a power conversion module configured to convert kinetic energy of fluid released from the reservoir and travelling through the flow path into electric energy.

The power generation system can be an open-loop system or a closed-loop system. For example, for an open-loop system, the fluid supply can be a natural water supply, such as a river or lake or rain. For a closed-loop system, the system can further include a lower reservoir or impoundment structure that houses the fluid supply.

The reservoir(s) or impoundment structures of the system can include energy dissipation elements that are configured to disrupt a direction of fluid flow and/or reduce a velocity of flowing fluid that is being pumped into the reservoir or impoundment structure. Such energy dissipation elements can be auxiliary precast segments, or can be at least partially defined by one or more auxiliary precast segments. Optionally, an auxiliary precast segment can include a coupling element for mechanical coupling to a precast element of the reservoir or impoundment structure. The energy dissipation elements can be disposed substantially vertically with respect to a base of the reservoir or impoundment structure and, optionally, provide for the multifunction purpose of supporting a roof that permanently covers or selectively covers the reservoir or impoundment structure. Vertically-disposed auxiliary precast segments can be further supported by auxiliary precast segments that extend between the vertically-disposed auxiliary precast segments. For example, auxiliary precast segments with a non-vertical orientation can be disposed between the vertically-disposed auxiliary precast segments. The energy dissipation elements can comprise perforated structures, such as defined by one or more precast segments. Energy dissipation elements can also be disposed in a fluid supply for an open-loop system. For example, energy dissipation elements can be disposed in an area at which water is released back to the natural water supply, so as to reduce impact of the flowing water on natural structures and on wildlife.

The reservoir(s) or impoundment structure(s) of the system can each include a continuous base, with precast segments forming the reservoir impoundment structure configured to couple to an upper surface of the base. Precast segments forming the reservoirs or impoundment structures can include precast segments having at least two opposing surfaces of a substantially triangular or truncated triangular shape. Such shape can provide for the precast segments to be alternately arranged to define a wall of the reservoir/impoundment structure and/or to define a buttress structure to support a wall of the reservoir/impoundment structure. Other shapes that define straight or curvilinear edges that enable adjacent arrangement to define a buttress structure may also be employed.

The flow path(s) of the system can be defined by at least two fluid conduits that are individually selectable for fluid transfer between the fluid supply and the reservoir/impoundment structure. For example, one of the fluid conduits can be utilized for upward flow, and the other for downward flow, with an option to alternate direction in each conduit. At least one dedicated pump can be included at each of the at least two fluid conduits. The fluid pump(s) of the system can be disposed at varying elevations. For example, at least two fluid pumps can be disposed at a conduit that defines a flowpath, the fluid pumps disposed at varying elevations. Optionally, one or more intermediary reservoirs/impoundment structures can be included, where the intermediary reservoirs/impoundment structures may include aspects constructed through the use of precast segments, such as any of the precast segments described herein. The inclusion of multiple fluid pumps for a flow path and intermediary reservoirs/impoundment structures along the flow path can provide for a configuration in which work is distributed throughout the system rather than performed by a single pump. Similarly, intermediate reservoirs/impoundment structures can be included along the flow path for downward flow, so as to not overwhelm a lower reservoir/impoundment structure or naturally water supply during periods of power generation.

In some embodiments, the fluid pump(s) may be used to force fluid to an upper reservoir/impoundment structure to retain the pumped fluid as potential energy and convert kinetic energy of fluid flowing downward into electrical power. For example, in one embodiment, the power generation module and power conversion module may be integrated into a single module that includes a turbine configured to rotate in a first direction to pump the fluid from the fluid supply and into the reservoir via the flow path and to rotate in a second direction to convert the kinetic energy of fluid released from the reservoir into electric energy.

Various configurations of precast segments can be used to construct or define the system. Precast segments can be provided for foundation segment(s) of the reservoir(s)/impoundment structure(s), as impound segments configured to encase infill to at least partially define the reservoir(s)/impoundment structure(s), and/or as fluid conduit segments to define the flow path(s) of the system. The reservoir(s)/impoundment structure(s) can include one or more precast segment(s) defining an outlet port for fluid released from the reservoir/impoundment structure and defining an inlet port for fluid pumped into the reservoir/impoundment structure. One or more inlet and/or outlet ports can be included. The inlet port can be disposed at a higher elevation than the outlet port.

The power generation system may have the power generation module and power conversion module integrated into a single module that includes a turbine configured to rotate in a first direction to pump the fluid from the fluid supply and into the reservoir/impoundment structure via the flow path and to rotate in a second direction to convert the kinetic energy of fluid released from the reservoir/impoundment structure into electric energy.

The power generation system may further comprise material flowed and coupled to a precast segment. The material may be positioned over a seam between adjacent precast segments or define an energy dissipation element.

The power generating system may comprise a three-dimensional (3D) material printing system coupled to a precast segment on a base of or at an upper surface of the reservoir/impoundment structure. In such an embodiment, the 3D material printing system may access material from a source of material located at the reservoir/impoundment structure and transfer the material to a different precast segment via a boom.

A power generation method includes, with a power generation system, transferring fluid from the fluid supply to the reservoir/impoundment structure via the flow path, releasing fluid from the reservoir/impoundment structure to the fluid supply via the flow path, and storing energy converted by the energy conversion component during fluid release.

In various embodiments, transferring of water from the water supply to the reservoir/impoundment structure can occur during a period of low-energy use by a community associated with a power grid that may supply power to or receive power from the power generation system such that the cost of energy is low while water is being pumped upward to the reservoir. Releasing of water from the reservoir/impoundment structure to the water supply occurs during a period of high-energy use such that power generated by the power generation system is available to serve the community via the power grid.

FIG. 1A shows a schematic of an example embodiment of a pump storage system 100. In various embodiments, such as the one shown in FIG. 1A, a pump storage system 100 may comprise an impoundment structure 101, at least one fluid conduit 120, and a powerhouse 110. The powerhouse 110 may be above ground or below ground. In various embodiments, the powerhouse may be mounted on a foundation that doesn't penetrate the ground. The pump storage system 100 may also be referred to as a power generation system herein.

The impoundment structure 101 is constructed and arranged to store a volume of fluid. In various embodiments, each impoundment structure 101 is composed of at least one precast segment. The at least one fluid conduit 120 (also referred to as a flow path structure) may be coupled to the impoundment structure 101 and the powerhouse 110 such that the fluid can flow from the impoundment structure 101 to the powerhouse 110 and then to a second location. In some embodiments, the second location is a second storage location, for example a second impoundment structure. In various embodiments, at least one of the fluid conduits comprises at least one precast segment. In some example embodiments, the impoundment structure includes a roof. In some example embodiments, the impoundment structure does not include a roof.

In various embodiments, such as the one shown in FIG. 1A, the pump storage system 100 comprises at least one intake module 130, each intake module 130 being configured to receive or emit fluid. Each of the at least one intake module 130 is coupled to a corresponding fluid conduit 120. In the embodiment shown FIG. 1A, the pump storage system 100 comprises three intake modules 130*a*-130*c*. In alternative embodiments, the pump storage system comprises a different number of intake modules.

In the embodiments shown in FIG. 1A the three intake modules 130*a*-130*c* are arranged in a row. In alternative embodiments, the different intake modules may be arranged differently.

In various embodiments, such as the one shown in FIG. 1A, the intake modules 130*a*-130*c* are located at an upper impoundment structure 101. In various embodiments, at least one intake module may be located at a lower impoundment structure or natural fluid storage location (e.g., a river, lake, pond, etc.).

In the embodiment shown in FIG. 1A the pump storage system comprises three fluid conduits. In alternative embodiments, the pump storage system may comprise a different number of fluid conduits. The fluid conduits may be arranged in different configurations. For example, the fluid conduits shown in FIG. 1A are straight. In alternative embodiments, one of more of the fluid conduits may be arranged differently. In some example embodiments, one or more of the fluid conduits may have a circular cross-section. In alternative example embodiments, one or more fluid conduits may have a cross-section of a different shape, for example square, rectangular, triangular, etc. In some example embodiments, one or more fluid conduits may include a precast segment.

In some example embodiments, one or more fluid conduits may be open (i.e., configured such that a fluid in the fluid conduit is exposed to the environment). In some example embodiments, one or more fluid conduits may be closed. In some example embodiments, precast structures define a flowpath.

In some example embodiments, one or more structures may secure the position of one or more fluid conduits. In some example embodiments, one or more of the one or more structures may include at least one precast segment. In some example embodiments, one or more of the structures may be configured to be secured to the ground for stability.

Figure 1B:
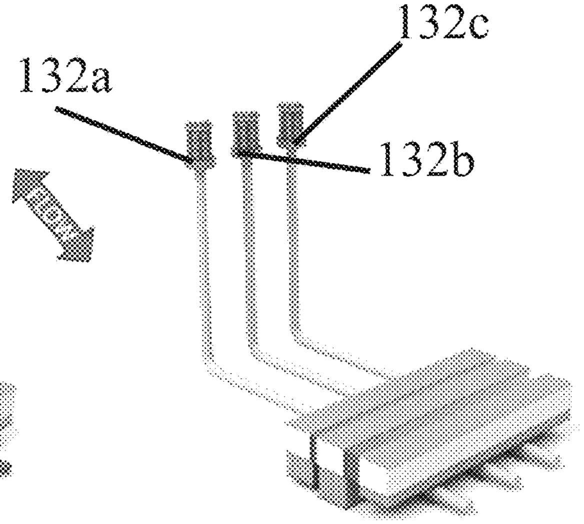
FIG. 1B shows a schematic of an example embodiment of a pump storage system.

FIG. 1B shows a schematic of an example embodiment of a pump storage system 100. In FIG. 1B the impoundment structure has been removed for clarity. In some embodiments, such as the one shown in FIG. 1B the fluid conduits are configured at a right angle.

In various embodiments, such as the ones shown in FIGS. 1A-1B, each intake module 130 comprises a support base 132. In alternative embodiments, one or more of the intake modules may not comprise a support base. In various embodiments, each intake module comprises an axial channel and the axial channel is coupled to the at least one of the at least one of the fluid conduits such that fluid passes down to the powerhouse.

In the example embodiment shown in FIGS. 1A and 1B, the powerhouse 110 includes three houses. In alternative embodiments, the powerhouse may include a different number of houses.

In some example embodiments, the powerhouse includes at least one valve house. The valve house may include at least one valve coupled with a fluid conduit. In some example embodiments, a house closest to the impoundment structure is a value house.

In some example embodiments, the powerhouse includes at least one electric house. In some example embodiments, a house farthest from the impoundment structure is an electric house.

In some example embodiments, the powerhouse includes at least one turbine house. The turbine house may include at least one turbine. In some example embodiments, a turbine house is between a valve house and an electric house.

Figure 2:
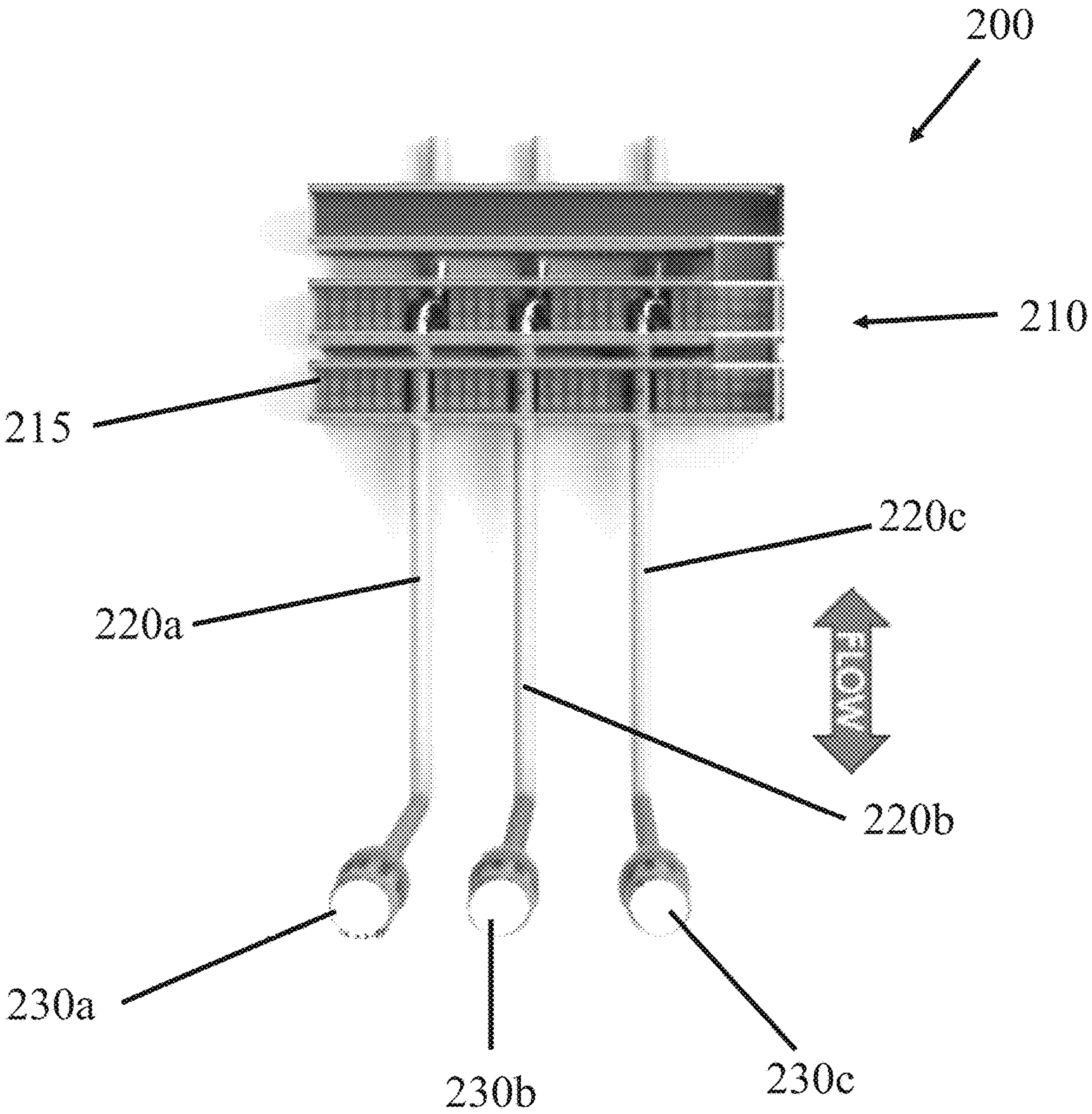
FIG. 2 shows a top view of an example embodiment of a pump storage system comprising three intake modules, each being coupled to a powerhouse via a fluid conduit.

FIG. 2 shows a top view of an example embodiment of a pump storage system 200 comprising three intake modules 230*a*-230*c*, each being coupled to a powerhouse 210 via a fluid conduit 220*a*-220*c*. The impoundment structure is not shown in this view. In various embodiments, such as the one shown in FIG. 2, the powerhouse 210 comprises three turbines. In alternative embodiments, the powerhouse may comprise a different number of turbines. In those embodiments in which the powerhouse is underground, the associated fluid conduits may also be underground. In various embodiments, the pump storage system may comprise more than one powerhouse.

In various embodiments, such as the one shown in FIG. 2, the powerhouse may comprise one or more modular blocks. In various embodiments, the modular blocks are precast.

Figures 3A, 3C:
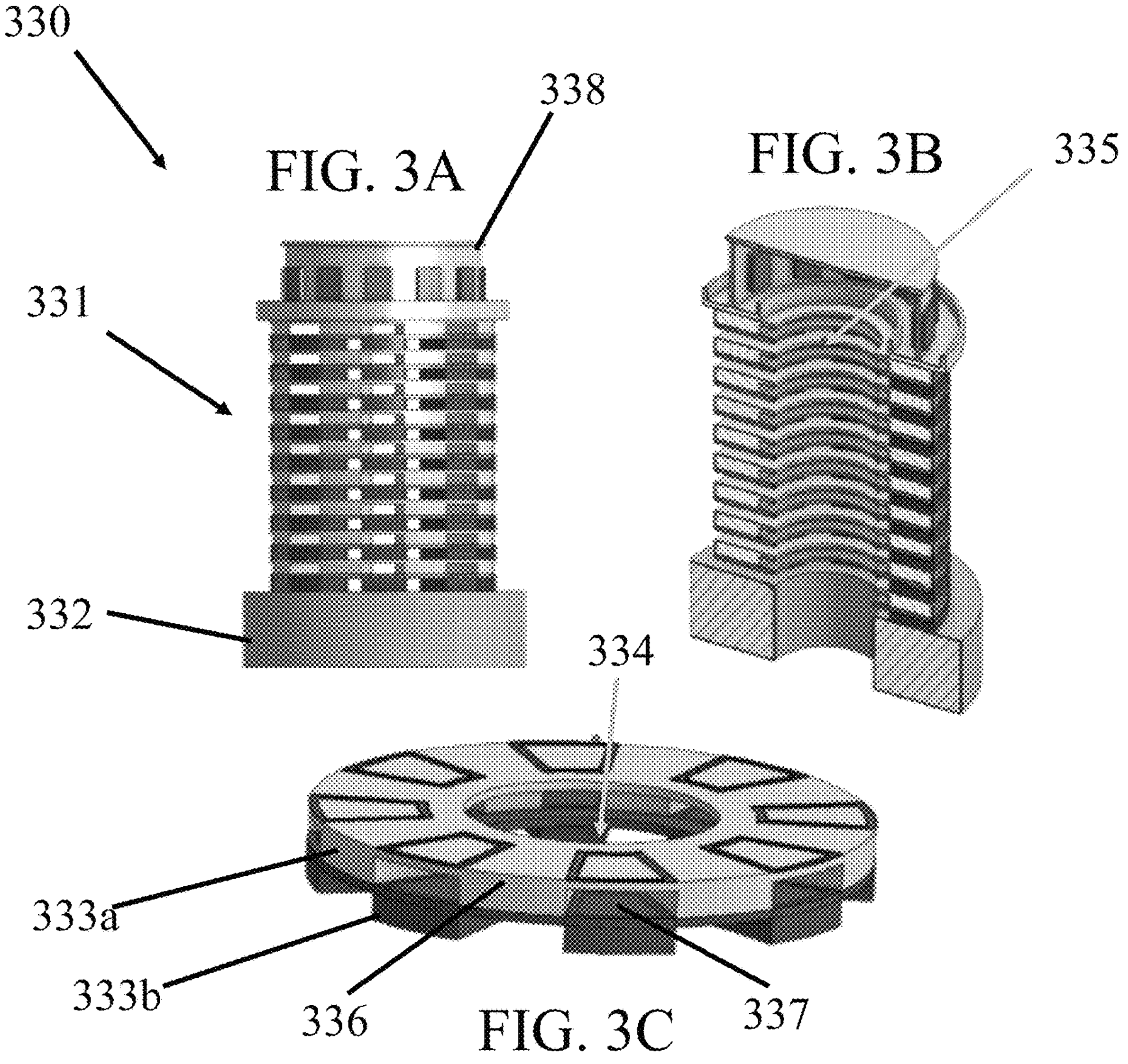
FIG. 3A shows a side view of an example embodiment of an intake module.
FIG. 3C shows a perspective view of an example embodiment of a layer of an intake module.

FIG. 3A shows a side view of an example embodiment of an intake module.

FIG. 3B shows a perspective sectional view of an example embodiment of an intake module.

FIG. 3C shows a perspective view of an example embodiment of a layer of an intake module.

One or more of the intake modules 330 may be constructed using precast components. In various embodiments, an intake module 330 may comprise a support base 332 and an at least one intake region 331. In the embodiment shown in FIG. 3A, the intake module 330 comprises one intake region 331. In alternative embodiments, the intake module may comprise more than one intake region coupled to a support base.

In various embodiments, the intake region 331 may comprise one or more layers 333. One or more of the one or more layers 333 may comprise precast segments. A portion of a layer may be a precast segment. An entire layer may be a precast segment. Multiple layers may together be a precast segment.

One or more of the one or more layers may comprise one or more apertures. In the embodiment shown in FIGS. 3A-3C, each layer 333 comprises one circular central aperture 334 and the circular aperture 334 is positioned at the center of the layer 333. In alternative embodiments, one or more of the layers may not comprise an aperture. In alternative embodiments, one or more of the layers may comprise more than one aperture. In alternative embodiments, one or more of apertures may comprise a different shape. In alternative embodiments, one or more of the apertures may be positioned off-center at the corresponding layer.

One or more apertures of the layers may form one or more axial channels 335 through the intake region 331 of the intake module 330. In the embodiment shown in FIGS. 3A-3C, the intake region 331 comprises one channel 335. In alternative embodiments, the intake region may comprise more than one channel.

The axial channel of the intake region may be aligned with an axial channel of the support base. The axial channel of the support base may be aligned with a channel of a fluid conduit.

One or more of the one or more layers 333 may comprise one or more protrusions 336. In various embodiments, a first layer 333*a* and a neighboring second layer 333*b* may be arranged such that the arrangement of protrusions 336 create apertures 337 at the sides of the intake region 331. These apertures 337 are configured to allow fluid to enter the intake module 330 and flow to an axial channel 335. In various embodiments, the protrusions 336 may be configured differently than the configuration shown in FIGS. 3A-3C.

In some example embodiments, one or more of the apertures 337 may be at least partially blocked with a cover (not shown). One or more of the one or more covers may be in communication with a controller. The controller may control the opening and/or closing of one or more of the covers. In some instances, the covers may all be opened and/or closed together. In some instances, some of the covers may be opened and/or closed selectively. In some instances, the covers at a specific layer may be opened and/or closed together. One or more of the covers may be opened and/or closed using any suitable mechanism, for example pneumatic controls, electromagnetic controls, and/or one or more screw drive actuators.

In some example embodiments, a user may control the opening and/or closing of covers using the controller. In some example embodiments, a user may control the opening and/or closing of covers using a local interface. In some example embodiments, a user may control the opening and/or closing of covers using a remote interface. In some example embodiments, the opening and/or closing of covers may be controlled automatically. In some example embodiments, the opening and/or closing of covers may be controlled based, at least in part, on environmental conditions, for example fluid levels.

In some example embodiments, the intake module may be in communication with one or more powerhouses. In some example embodiments, the intake module may be in wireless communication with one or more powerhouses. In some example embodiments, the intake module may be in wired communication with one or more powerhouses. In some example embodiments, communication between one or more intake modules and one or more powerhouses may determine settings at one or more intake module or one or more powerhouse. For example, flow control gate configurations at a powerhouse may be based, at least in part, on information from an intake module.

In the embodiment shown in FIGS. 3A-3C, each layer 333 comprises a circular shape. In alternative embodiments, one or more of the layers may comprises a different shape. In the embodiment shown in FIGS. 3A-3C each support base 332 comprises a circular shape. In alternative embodiments, the support base may comprise a different shape.

In some embodiments, the top of the intake region comprises a cover 338. In alternative embodiments, the top of the intake region may comprise at least one aperture. In various embodiments, at least one aperture of the at least one aperture at the top of the intake region may be aligned with at least one axial channel. In various embodiments, the cover of the intake region may comprise one or more precast components.

One more intake module may be located in or near an upper impoundment structure, a lower impoundment structure, an intermediary impoundment structure, a dam, or a natural water source (e.g. a river, lake, pond, etc.). In various embodiments, the intake module may be constructed using cast in place techniques.

Figure 4:
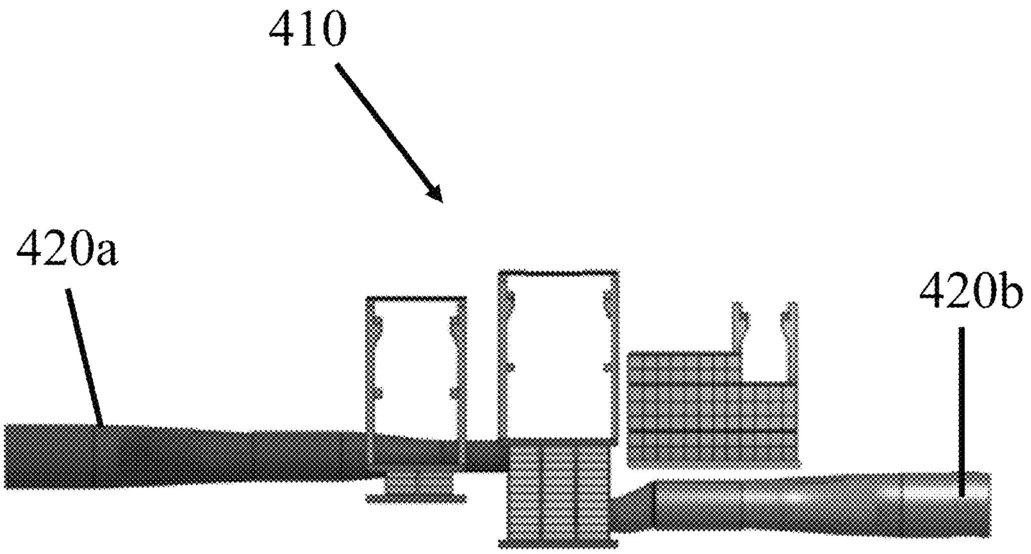
FIG. 4 shows a side view of a schematic of a portion of an example embodiment of a powerhouse.

FIG. 4 shows a side view of a schematic of a portion of an embodiment of a powerhouse 410. In various embodiments, such as the one shown in FIG. 4, the fluid conduit into the powerhouse (420*a*, left) may be at a different height than the fluid conduit leaving the powerhouse 420*b*. In various embodiments, one or more of the fluid conduits may comprise a steel lining. In some example embodiments, the fluid conduit may include at least one penstock. In at least some instances, a flow path structure may be a fluid conduit. In at least some instances, an intake tube may be a fluid conduit. In at least some instances, a draft tube may be a fluid conduit.

Figure 5:
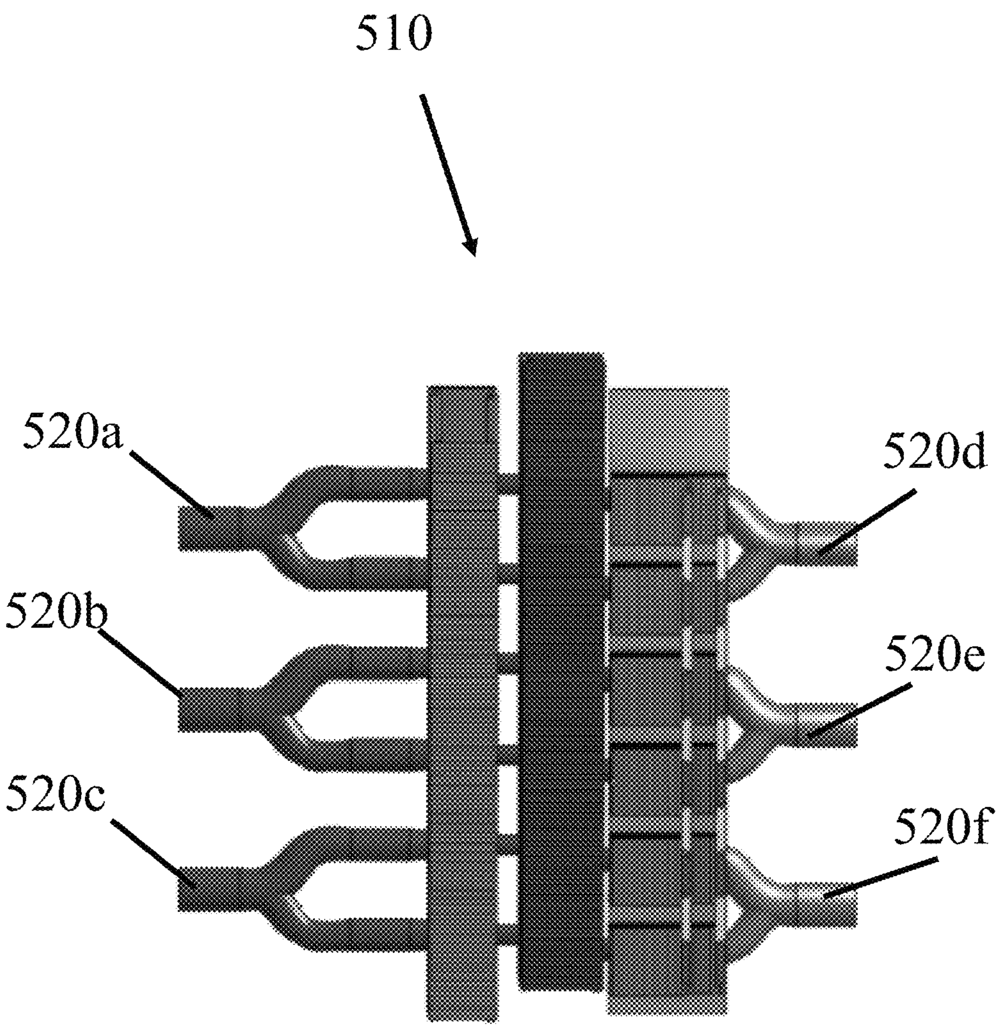
FIG. 5 shows a top view of a schematic of a portion of an example embodiment of a powerhouse.

FIG. 5 shows a top view of a schematic of a portion of an example embodiment of a powerhouse 510. As shown in FIG. 5, the fluid conduits into the powerhouse (520*a*-520*c*, left) may comprise Y-junctions. As shown in FIG. 5, the fluid conduits out of the powerhouse (520*d*-520*f*, right) may comprise Y-junctions. In alternative embodiments, the fluid conduits into and/or out of the powerhouse may not comprise Y-junctions.

Figure 6:
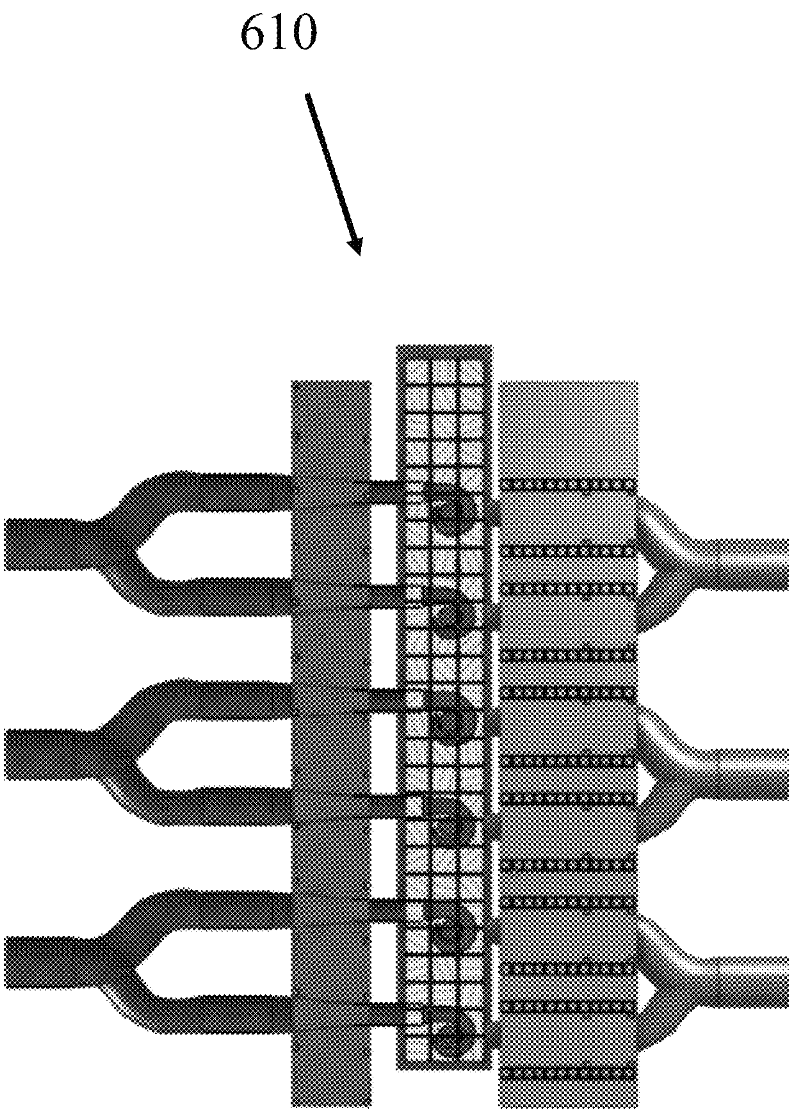
FIG. 6 shows a top view of a schematic of a portion of an example embodiment of a powerhouse.

FIG. 6 shows a top view of a schematic of a portion of an embodiment of a powerhouse 610. In embodiment, the intake fluid conduits are coupled to six turbines. In alternative embodiments, the powerhouse may comprise a different number of turbines. In the embodiment shown in FIG. 6 the turbines are arranged in a row. In alternative embodiments, the turbines may be arranged differently.

Figure 7:
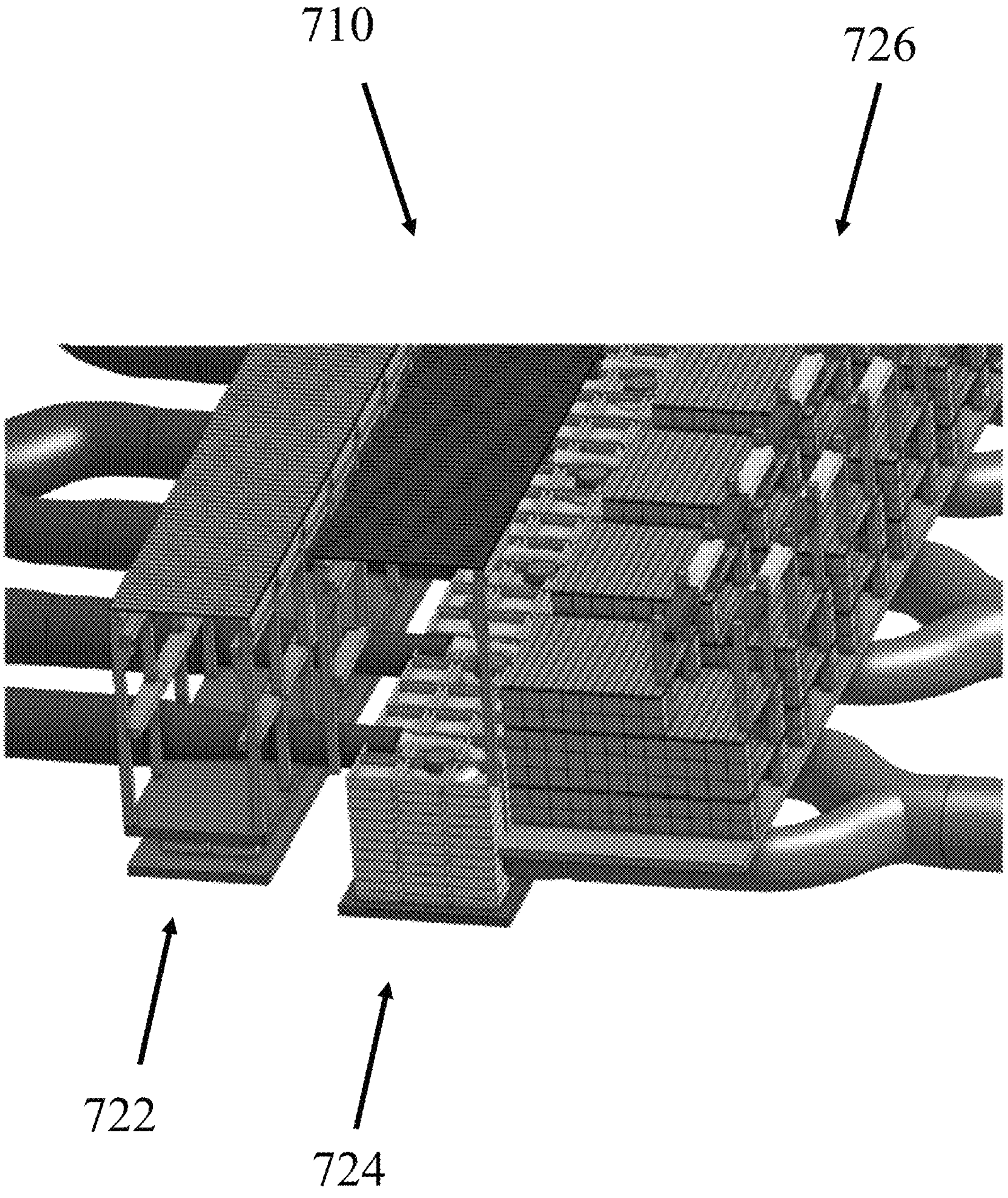
FIG. 7 shows a perspective view of a schematic of a portion of an example embodiment of a powerhouse.

FIG. 7 shows a perspective view of a schematic of a portion of an embodiment of a powerhouse 710. In this embodiment, the powerhouse 710 comprises different types of modular blocks. In some embodiments, such as the one shown in FIG. 7, the power generation system, comprises an intake support structure 722, a power generator support structure 724, and a draft support structure 726.

In some example embodiments, the intake support structure 722 may be configured to support at least one intake tube, the intake tube at least partially defining a flow path. In some example embodiments, the intake support structure 722 may be at least partially constructed of precast segments.

In some example embodiments, the power generator support structure 724 may be configured to support weight of a power generator in an arrangement operably disposed within the flow path. In some example embodiments, the power generator support structure 724 may be at least partially constructed of precast segments.

In some example embodiments, the draft support structure 726 may be configured to support at least one draft tube, the draft tube at least partially defining the flow path. In some example embodiments, the draft support structure 726 may be at least partially constructed of precast segments. In some example embodiments, the precast segments may be positioned above the at least one draft tube. In some example embodiments, such as the one shown in FIG. 7, the precast segments of the draft support structure function as thrust blocks to control thrust from the draft tube.

In some example embodiments, at least one of the precast segments of the power generator support structure 724 includes a form that defines an internal cavity. In some example embodiments, at least one of the precast segments of the intake support structure 724 includes a form that defines an internal cavity. In some example embodiments, at least one of the precast segments of the draft support structure 724 includes a form that defines an internal cavity.

In some example embodiments, one or more precast segments of the intake support structure may be positioned above the at least one draft tube. In some example embodiments, one or more precast segments of the power generator support structure may be positioned above the at least one draft tube.

In some example embodiments, at least two of the intake support structure 722, the power generator support structure 724, and the draft support structure 726 are removably coupled.

In some example embodiments, for example the one shown in FIG. 7, one or more prestressed beams may be coupled to one or more elements of the powerhouse. In some example embodiments, one or more of the prestressed beams may be oriented vertically. In some example embodiments, one or more of the prestressed beams may be oriented horizontally.

In some example embodiments, the powerhouse may include one or more cranes. For example, if the powerhouse includes multiple houses, there may be a crane associated with each house. In some embodiments, there may be more than one crane at a house of the powerhouse. In some embodiments, a house of the powerhouse may not include a crane. In some example embodiments there may be at least one crane associated with the intake support structure. In some example embodiments there may be at least one crane associated with the power generator support structure. In some example embodiments there may be at least one crane associated with the draft support structure.

In some example embodiments, a powerhouse may include one or more flow control gates. In some example embodiments, one or more flow control gates may be positioned in a fluid conduit.

Figure 8A:
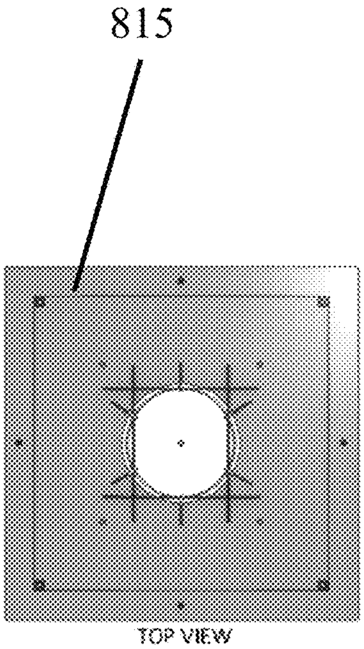
FIG. 8A shows a top view of an example embodiment of a modular block.

FIG. 8A shows a top view of an example embodiment of a modular block 815. In various embodiments, such as the embodiment shown in FIG. 8A, the modular block 815 comprises a square shape. In alternative embodiments, the modular block may comprise a different shape, including, but not limited to rectangle, circle, trapezoid, any such suitable polygon, or combinations thereof.

Figure 8B:
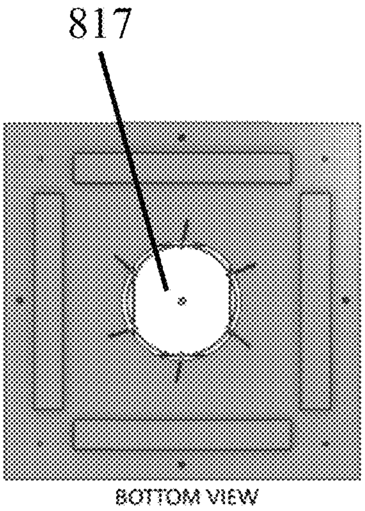
FIG. 8B shows a bottom view of the example embodiment of a modular block of FIG. 8A.

FIG. 8B shows a bottom view of the example embodiment of a modular block of FIG. 8A.

Figure 8C:
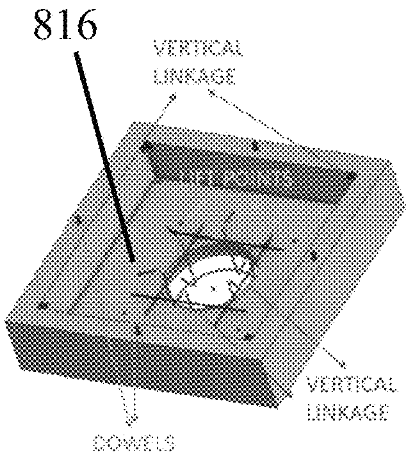
FIG. 8C show s bottom view of the example embodiment of a modular block of FIG. 8A.

FIG. 8C show s bottom view of the example embodiment of a modular block of FIG. 8A. In various embodiments, such as the one shown in FIG. 8A, the modular block 815 defines a cavity 816 configured to receive a filling material. Example filling materials may include, but are not limited to: concrete, cement, ecomaterials, volcanic ash, glass, portions of brick, rubble, ground auto tires, steel fibers, fiber mesh, carbon fiber, flowable fill, or portions of solar panels.

In various embodiments, such as the embodiment shown in FIG. 8C, the modular block 815 defines a cavity 816 with a square shape. In alternative embodiments, the modular block may define a cavity with a different shape, including, but not limited to rectangle, circle, trapezoid, any such suitable polygon, or combinations thereof. In alternative embodiments, the cavity may comprise a different volume.

In alternative embodiments, the cavity may be divided into different sections.

In various embodiments, such as the one shown in FIGS. 8A-8C, the modular block 815 defines at least one aperture 817. In the embodiment shown in FIGS. 8A-8C the modular block 815 comprises one aperture 817. In alternative embodiments, a modular block may comprise a different number of apertures.

In various embodiments, such as the one shown in FIGS. 8A-8C, the aperture has a circular shape. In alternative embodiments, the modular block may define an aperture with a different shape, including, but not limited to rectangle, square, trapezoid, any such suitable polygon, or combinations thereof.

In various embodiments, such as the one shown in FIGS. 8A-8C, the aperture 817 is centrally located in the cavity 816 of the modular block 815. In alternative embodiments, at least one aperture may be located at a different location.

In various embodiments, the modular block may comprise one or more curing chambers. In various embodiments, one or more of the curing chambers may comprise characteristics identical or similar to those characteristics described in connection with any other figure.

In various embodiments, such as the one shown FIGS. 8A-8C, the modular block 815 comprises one or more attachment mechanisms constructed and arranged to allow the modular block to couple to other modular blocks or structures. The embodiment shown in FIGS. 8A-8C shows different attachment mechanisms including dowels, elongated members, and/or vertical linkages. The modular block attachment mechanism may comprise one or more elongated members. At least one of the elongated members may be configured to couple one modular block to a neighboring modular block. For example, as shown in FIGS. 8A-8C, one or more elongated members may pass through the aperture 817 of the modular block 815 and be arranged in a bent configuration. Some elongated members may be used to secure other elongated members in place. The elongated members may comprise any suitable material, including, but not limited to metal, plastic, or combinations thereof. Different modular blocks may comprise different numbers of elongated members. The modular block may also be configured to include one or more lift points. In some example embodiments, one or more modular blocks may be coupled using one or more expandable linkages.

Figure 9A:
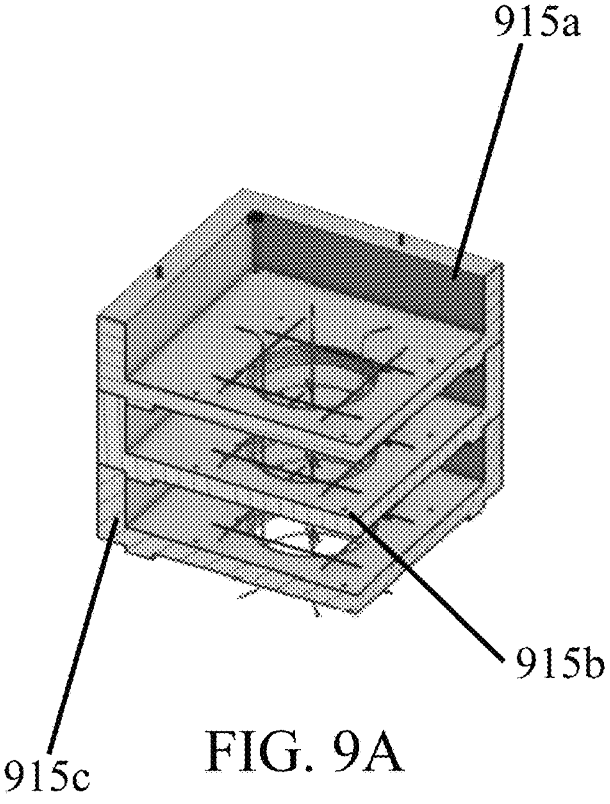
FIG. 9A is a perspective view of an example embodiment of three modular blocks in a stacked configuration.

FIG. 9A is a perspective view of an example embodiment of three modular blocks 915 in a stacked configuration. In various embodiments, such as the one shown in FIG. 9A, one or more modular blocks may be stacked, with at least one of the blocks coupled to a neighboring block. In this embodiment, elongated members from a modular block are coupled to elongated members of the neighboring modular block. In various embodiments, the elongated members of a modular block may be indirectly coupled to the elongated members of a neighboring modular block. In various embodiments, the elongated members may be arranged such that when a filling material is inserted into the cavity of a modular block, it will submerge one or more of the elongated members.

In some instances, filling material may be poured through an aperture of one modular block to fill a lower modular block. In various embodiments, a modular block at the top of a stack of modular blocks is capped.

Figure 9B:
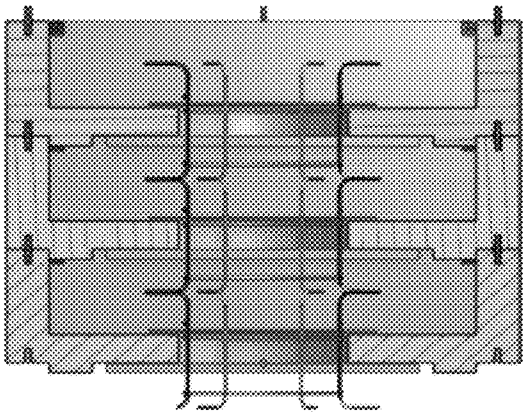
FIG. 9B is a side view of the example embodiment of FIG. 9A.

FIG. 9B is a side view of the example embodiment of FIG. 9A.

Figure 10A:
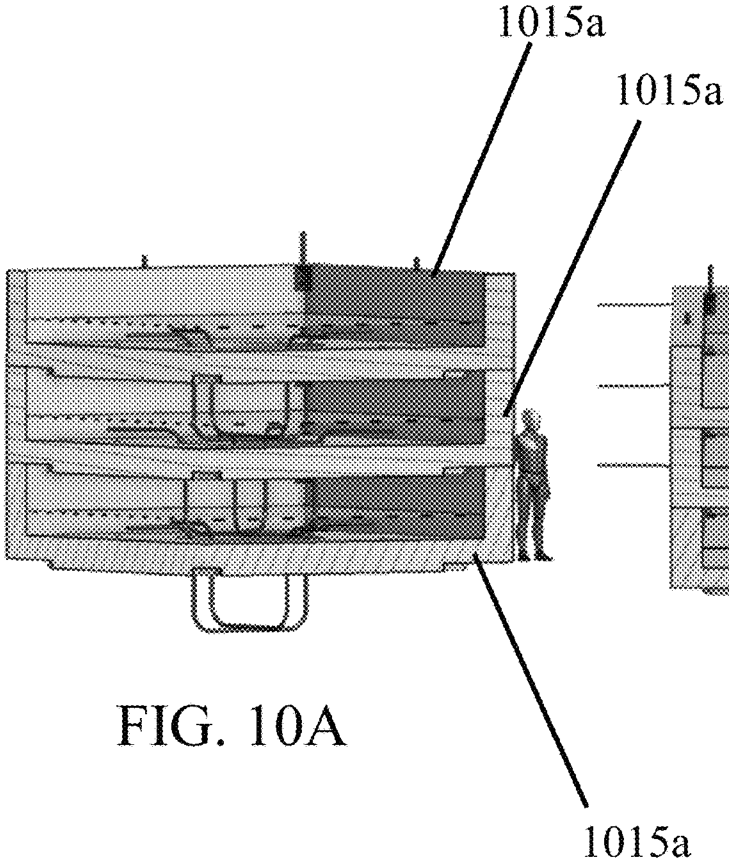
FIGS. 10A-10B are perspective views of an example embodiment of three modular block in a stacked configuration and shows example levels to which the cavity of each modular block may be filled.
Figure 10B:
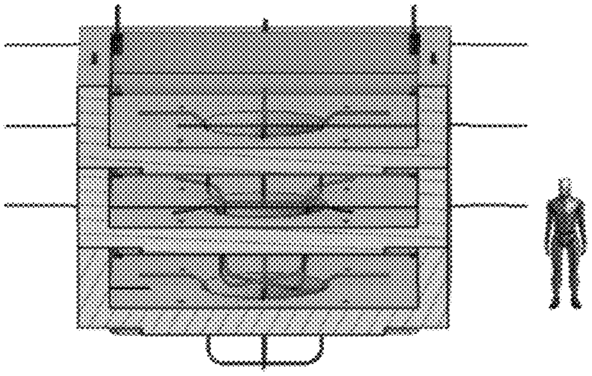

FIGS. 10A-10B are perspective views of an example embodiment of three modular block in a stacked configuration and shows example levels to which the cavity of each modular block may be filled. The level to which the cavities may be filled may be similar (or approximately the same) or the levels may be different for different blocks. In some instances, one or more of the blocks that are coupled may not include a cavity.

Figure 11:
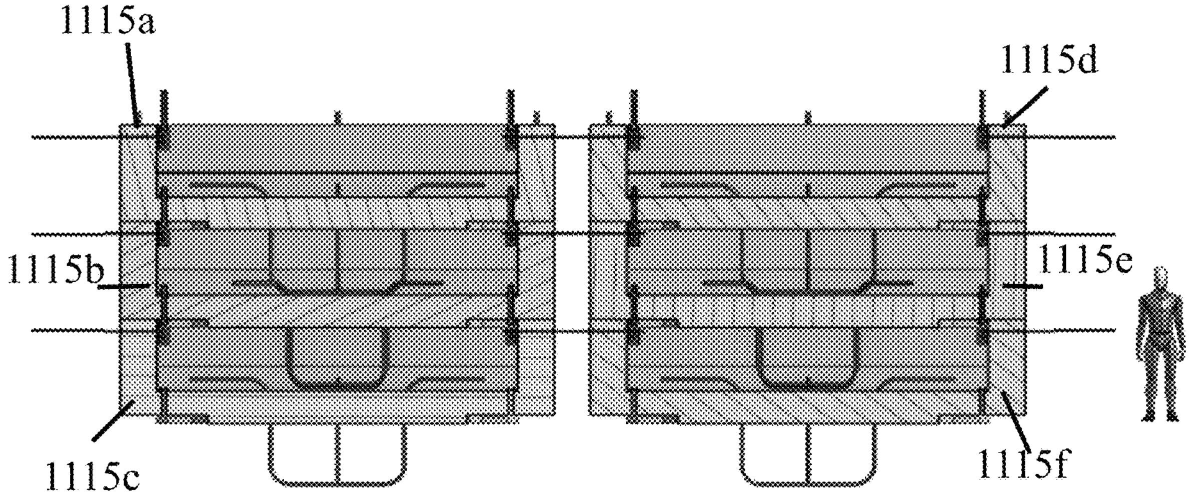
FIG. 11 shows an example embodiment of two stacks of modular blocks, the two stacks being coupled together laterally.

FIG. 11 shows an example embodiment of two stacks of modular blocks **1115*a*-1115*f***, the two stacks being coupled together laterally. In different configurations a different number of modular blocks may be coupled vertically and/or horizontally.

In various embodiments, one or more modular blocks may be configured to individually serve as a capacitor. In various embodiments, one or more modular blocks may be coupled to collectively serve as a capacitor.

In various embodiments, one or more of the modular blocks may be coupled using at least one dowel, at least one bolt, at least one keyway, at least one re-rod, or at least one port. In various embodiments, one or more of the modular blocks may be coupled using at least one expandable linkage, at least one automatic linkage (that locks itself), at least one prestressed cable (vertical configuration, horizontal configuration, or other configuration), at least one linkage port, or any other mechanism suitable for connecting items.

In various example embodiments, spaces between neighboring precast segments may be filled with concrete, grout, liners, or water stopping agents. In various example embodiments, spaces between precast segments and other elements (for example, fluid conduits) may be filled with concrete, grout, liners, or water stopping agents. In various example embodiments, spaces within precast forms may be filled with concrete, grout, liners, or water stopping agents. In various example embodiments, spaces between any elements associated with a powerhouse or dam may be filled with concrete, grout, liners, or water stopping agents.

In various example embodiments, one or more nanotech coatings may be applied to seals or filler materials between neighboring precast segments. In various example embodiments, one or more nanotech coatings may be applied to seals or filler materials between precast segments and other elements (for example, fluid conduits). In various example embodiments, one or more nanotech coatings may be applied to seals or filler materials between spaces or filler material within precast forms. In various example embodiments, one or more nanotech coatings may be applied to seals or filler materials associated with a powerhouse or dam.

Figure 12:
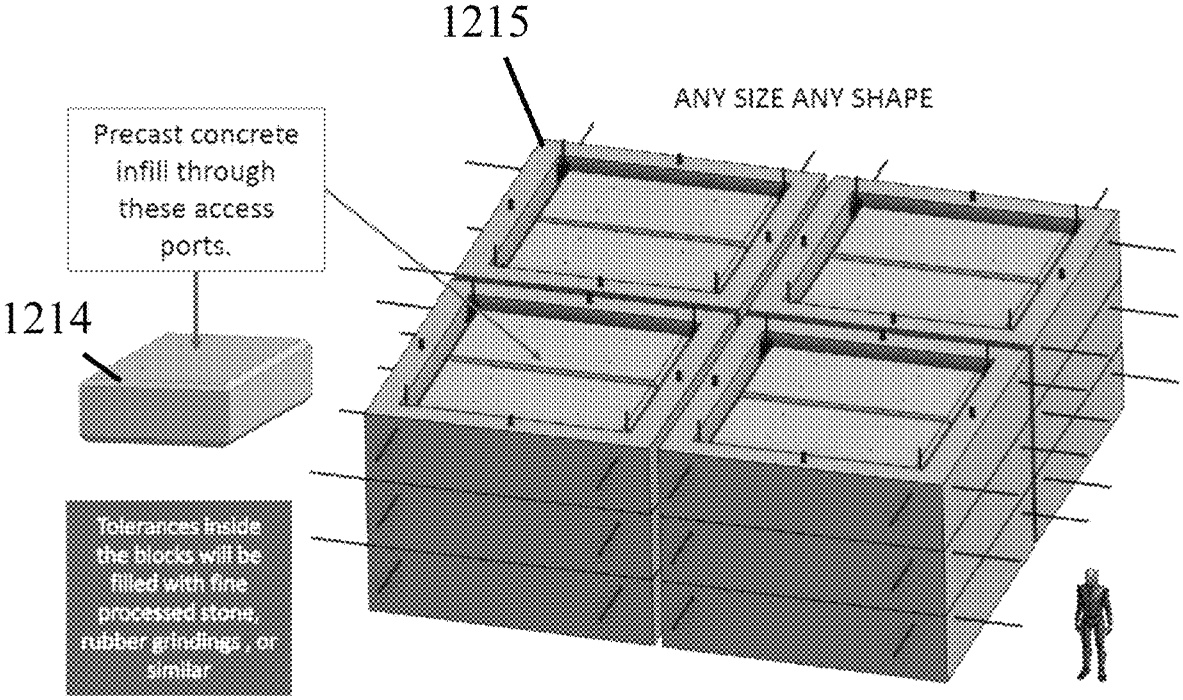
FIG. 12 shows an example embodiment of four stacks of modular blocks and precast concrete infill blocks.

FIG. 12 shows an example embodiment of four stacks of modular blocks 1215 with precast concrete infill blocks 1214. In some example embodiments a precast segment includes a precast form and a precast infill block 1214. The precast form may be sized and shaped to accept one or more precast infill blocks 1214. In some example embodiments, the tolerances (i.e., spaces) inside the modular blocks 1215 may be filled with fine processed stone, rubber grindings, or any such similar or suitable material, for example other materials described herein.

In the example embodiment shown in FIG. 12, precast infill blocks 1214 are defined by a rectangular shape. In alternative embodiments, one or more of the precast infill blocks may be defined by a different shape.

In the example embodiment shown in FIG. 12, two precast infill blocks 1214 are positioned in a modular block

1215. In alternative embodiments, a different number of precast infill blocks may be positioned in a modular block 1215.

In the example embodiment shown in FIG. 12, two precast infill blocks 1214 are oriented next to each other. Alternatively or additionally, in some example embodiments precast infill blocks 1214 may be stacked on each other.

In some example embodiments, one or more of the precast infill blocks are fixedly coupled to a precast segment. In alternative embodiments, one or more of the precast infill blocks may not be fixedly coupled to a precast segment.

Figure 13:
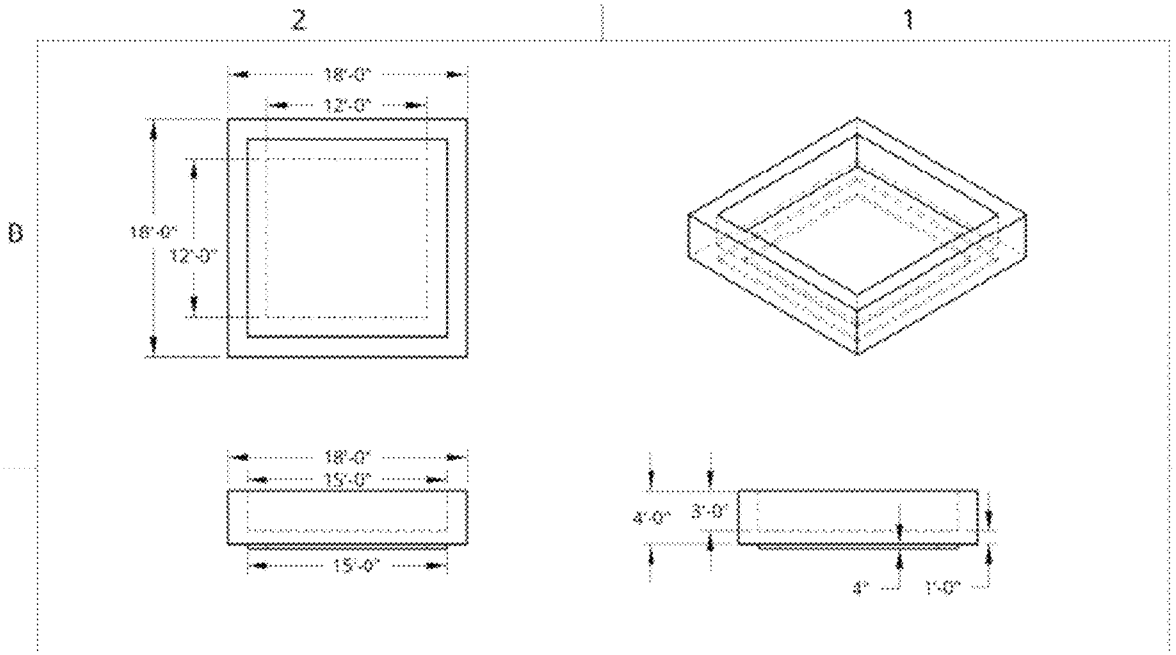
FIG. 13 shows example dimensions for an example embodiment of a modular block.

FIG. 13 shows example dimensions for an example embodiment of a modular block. In alternative embodiments, the dimensions may be different. In some embodiments, a modular block may be about 18 feet by 18 feet. In some embodiments, the modular block may be about 4 feet thick. In some embodiments a cavity of a modular block may be about 15 feet by 15 feet. In some embodiments, a cavity of the modular block may be about 3 feet deep. In some embodiments, a keyway may be at a lower surface of the block and have dimensions of about 12 feet by 12 feet. In some embodiments, a modular block and/or keyway may have dimensions that are different than those shown in FIG. 13.

Figure 14:
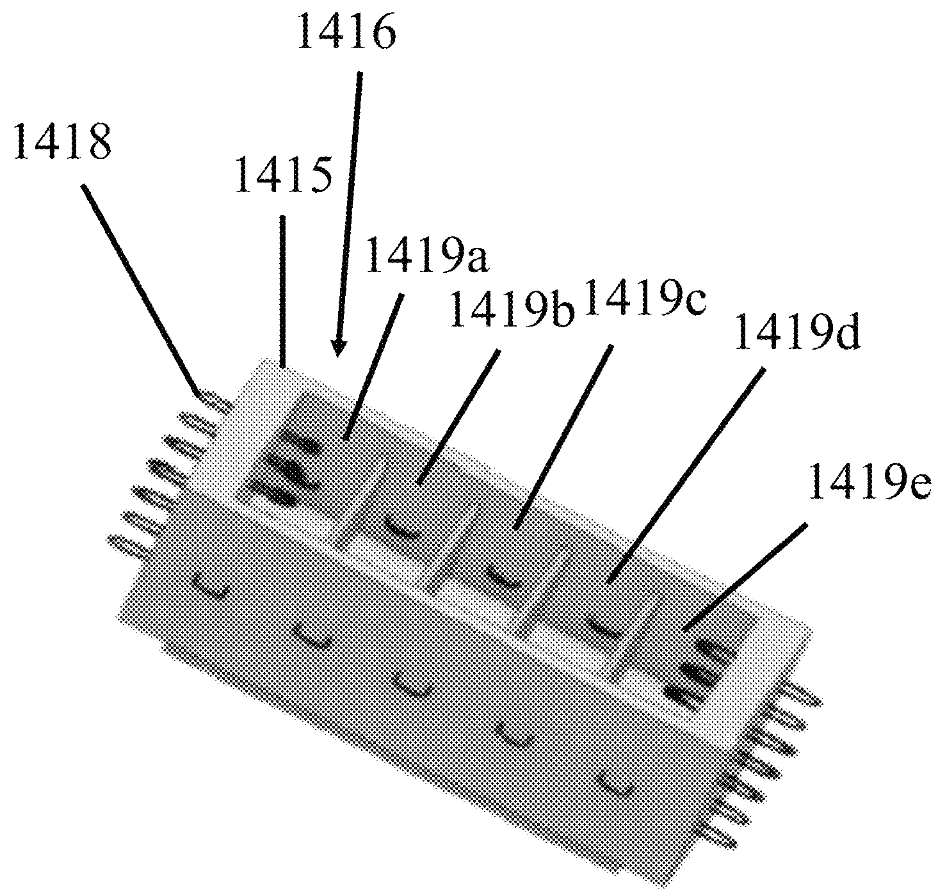
FIG. 14 shows an example embodiment of a rectangular modular block.

FIG. 14 shows an example embodiment of a rectangular modular block 1415. In this embodiment the rectangular modular block 1415 comprises a rectangular cavity 1416. In alternative embodiments, the cavity may be a different shape.

In various embodiments, such as the one shown in FIG. 14, the rectangular modular block 1415 may comprise one or more attachment loops 1418 configured to allow for coupling to other structures or coupling to fillable material. In the embodiment shown in FIG. 14, the modular block 1415 comprises attachment loops 1418 both in the cavity and outside the cavity. In alternative embodiments, the modular block may comprise attachment loops in a different configuration. In alternative embodiments, the modular block 1415 may comprise attachment loops only outside the cavity. In alternative embodiments, the modular block 1415 may comprise attachment loops only inside the cavity. In alternative embodiments, the modular block 1415 may not comprise attachment loops.

A modular block may comprise different curing compartments. In the embodiment shown in FIG. 14, the modular block 1415 comprises five curing compartments 1419*a*-1419*e*. In alternative embodiments, the modular block 1415 may comprise a different number of curing compartments. In the embodiment shown in FIG. 14, the curing compartments 1419 are arranged such that they extend along a shorter dimension of the modular block 1415. In alternative embodiments, the curing compartments 1419 extend along the longer dimension of the modular block 1415. In alternative embodiments, the curing compartments 1419 extend along a diagonal dimension of the modular block 1415. In alternative embodiments, the curing compartments 1419 extend along a different dimension of the modular block 1415. In various embodiments, the rectangular modular block 1415 may comprise at least one aperture.

Figures 15A, 15B:
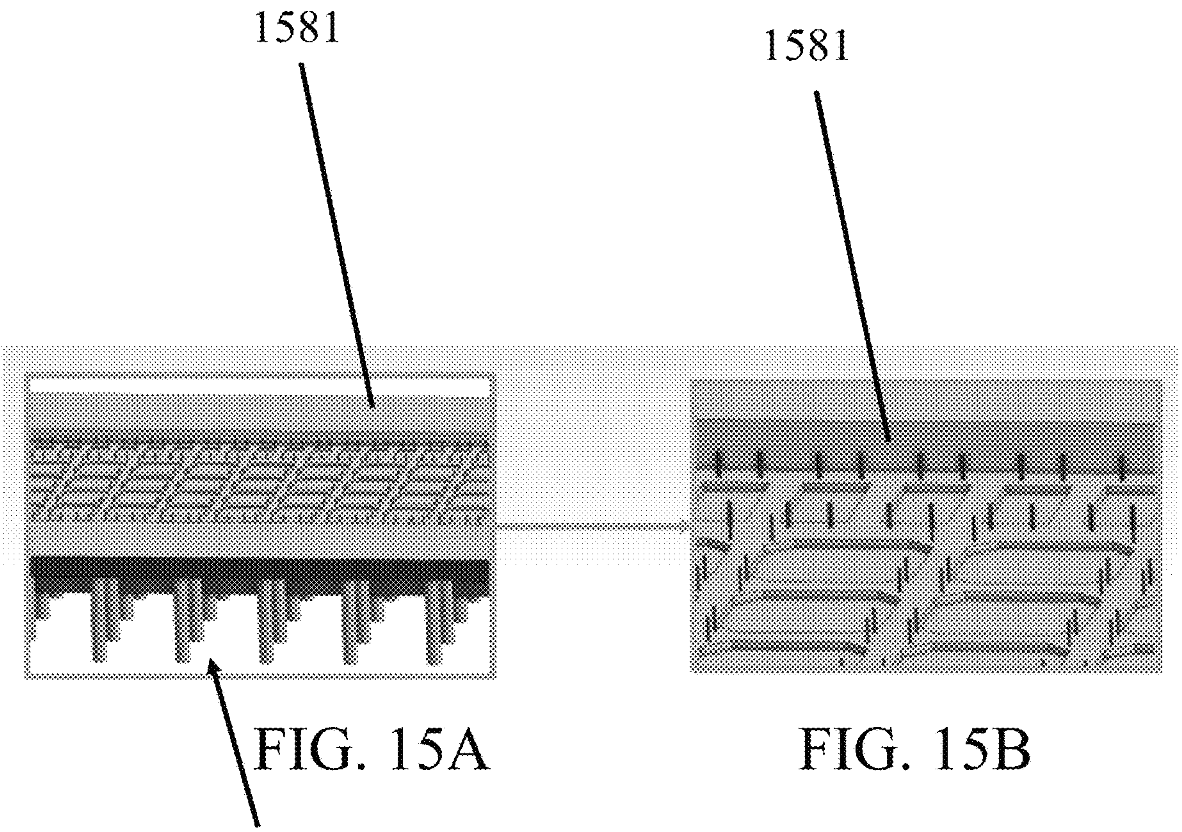
FIG. 15A shows a perspective of an example embodiment of a working platform coupled to rock anchors.
FIG. 15B shows a close-up view of the example embodiment of a working platform of FIG. 15A.

FIG. 15A shows a perspective of an example embodiment of a working platform 1581 coupled to rock anchors 1582.

FIG. 15B shows a close-up view of the working platform 1581 of FIG. 15A. In some example embodiments, such we the one shown in FIG. 15B, the working platform 1581 comprises pleats and/or grooves configured to couple with segments of a powerhouse or dam. In alternative embodiments the working platform may not comprise pleats and/or grooves.

In some embodiments, such we the one shown in FIG. 15B, the working platform 1581 is coupled to connectors (for example, bolts) to couple with segments of a powerhouse or dam. In alternative embodiments, the working platform may not be coupled to connectors.

Figure 16A:
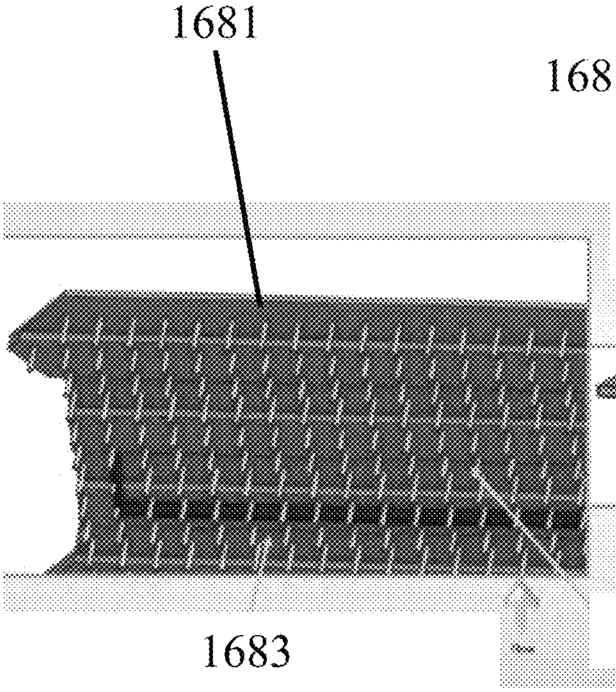
FIG. 16A shows a perspective view of an example embodiment of a working platform coupled to multiple rock anchors.

FIG. 16A shows a perspective view of an example embodiment of a working platform 1681 coupled to multiple rock anchors 1682. In the example embodiment shown in FIG. 16A a cutoff wall 1683 is coupled to a lower surface of the working platform 1681.

Figure 16B:
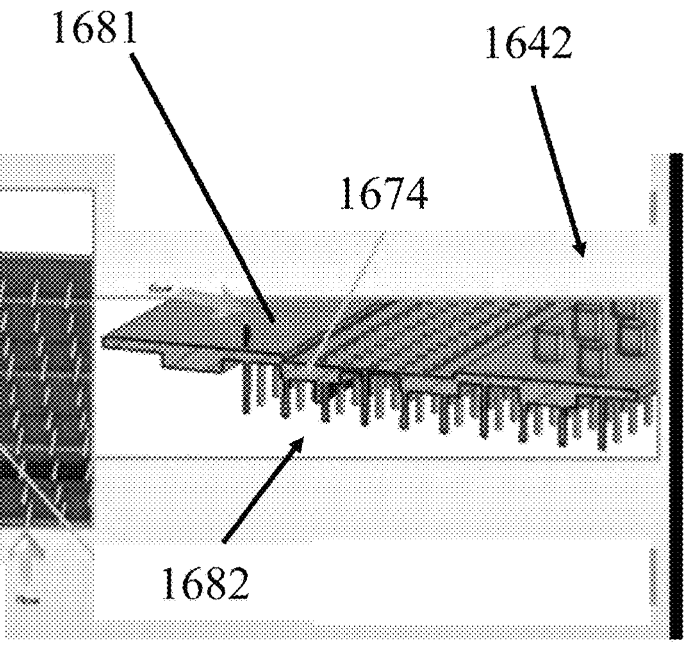
FIG. 16B shows a perspective view of an example embodiment of a working platform coupled to multiple cleats, rock anchors, and diffusers.

FIG. 16B shows a perspective view of an example embodiment of a working platform 1681 coupled to multiple cleats 1674, rock anchors 1682, and diffusers 1642. In the example embodiment shown in FIG. 16B the diffusers are coupled to a downstream side of the working platform 1681. In alternative embodiments, the working platform may not be coupled to cleats. In alternative embodiments, the working platform may not be coupled to rock anchors. In alternative embodiments, the working platform may be coupled to diffusers at the upstream side of the working platform. In alternative embodiments, the working platform may not be coupled to diffusers.

Figure 17:
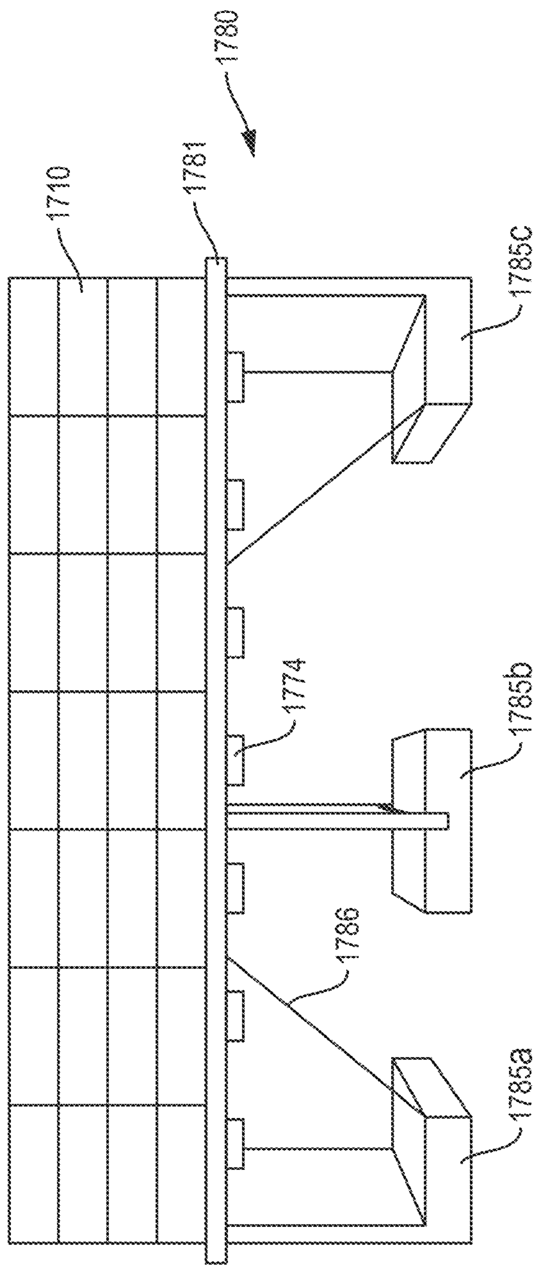
FIG. 17 shows an example embodiment of an earthquake prevention system.

FIG. 17 shows an example embodiment of an earthquake prevention system 1780. Any of the structures described herein such as an impoundment structure, tank, or powerhouse may comprise an earthquake prevention system 1780. In various embodiments, the earthquake prevention system 1780 may comprise at least one platform 1781 coupled to a lower surface of a powerhouse 1710 (or other structure such as an impoundment structure or tank). In various embodiments, such as the one shown in FIG. 17 the platform is coupled to multiple blocks or precast segments. In various embodiments the platform is coupled to modular blocks. The earthquake prevention system 1780 may comprise one or more precast components. In various embodiments, one or more components of the earthquake prevention system 1780 are constructed with precast components.

In various embodiments, the earthquake prevention system 1780 may comprise at least one cleat 1774. In various embodiments, the earthquake prevention system may comprise at least one cleat 1774 coupled to at least one of the at least one platform 1781. In alternative embodiments, the platform may be coupled to a different number of cleats. In various embodiments, processed stone is positioned around the cleats. In various embodiments, the earthquake prevention system 1780 is configured such that water can be injected around at least one of the cleats.

In various embodiments, the earthquake prevention system may comprise at least one subsurface structure 1785 coupled to the platform. In various embodiments, the earthquake prevention system or stabilization system 1780 may comprise at least one subsurface structure 1785 coupled to the platform using at least one corresponding cable 1786. In the embodiment shown in FIG. 17, the earthquake prevention system 1780 includes three subsurface structures 1785*a*-1785*c*. In alternative embodiments, the earthquake prevention system 1780 may include a different number of subsurface structures.

In the embodiment shown in FIG. 17, at least two of the subsurface structures 1785 are coupled to a platform 1781 with a cable 1786. In alternative embodiments, a different configuration of cables may be used.

In various embodiments, at least one of the at least one platform comprises at least two segments. In various embodiments, the at least two segments are coupled using rubberized interconnections. In various embodiments, the at least two segments are coupled using keyway linkages.

In various embodiments, the earthquake prevention system may comprise a first platform and a second platform, the second platform being larger than the first platform.

In various embodiments, the earthquake prevention system may comprise one or more snubbers. Snubbers may comprise insulators that reduce vibrations and allow for little movement.

Figure 18:
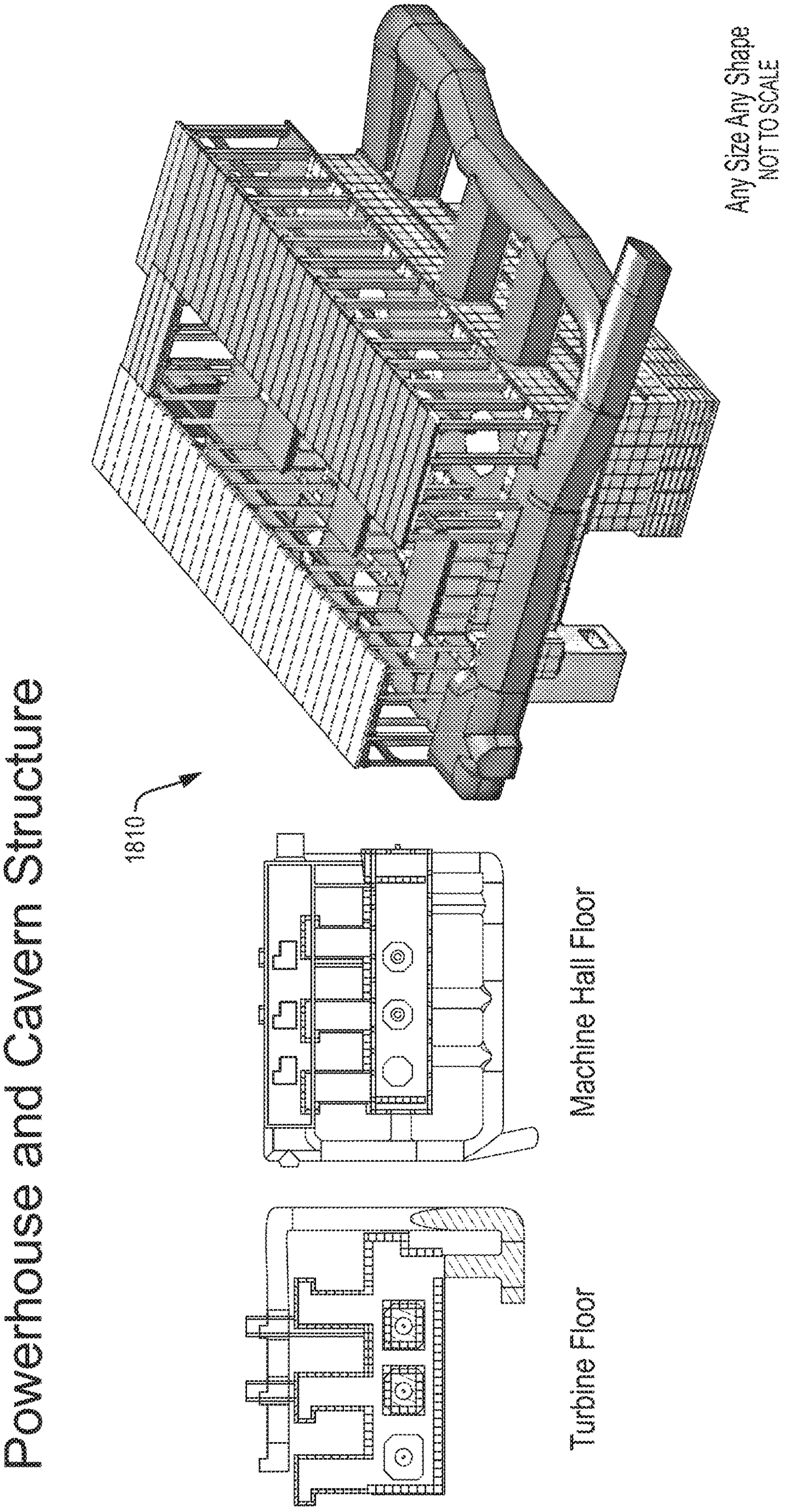
FIG. 18 shows an example embodiment of a powerhouse configured to be at a cavernous subterranean location underground.

FIG. 18 shows an example embodiment of a powerhouse 1810 configured to be at a cavernous subterranean location underground. In some example embodiments, a powerhouse may be positioned 400 feet underground. In some example embodiments, a powerhouse may be positioned 2000 feet underground. In alternative embodiments, the powerhouse may be a different depth underground. In some example embodiments, an upper impoundment structure may be positioned 400 feet above sea level. In alternative embodiments, an upper impoundment structure may be positioned at a different height.

In some example embodiments, the powerhouse is composed of precast segments. In some example embodiments, the powerhouse is composed of poured concrete. A flow path may extend from the cavernous powerhouse to one or more impoundment structures. The flow path may be composed of precast segments and/or poured concrete.

Figure 19:
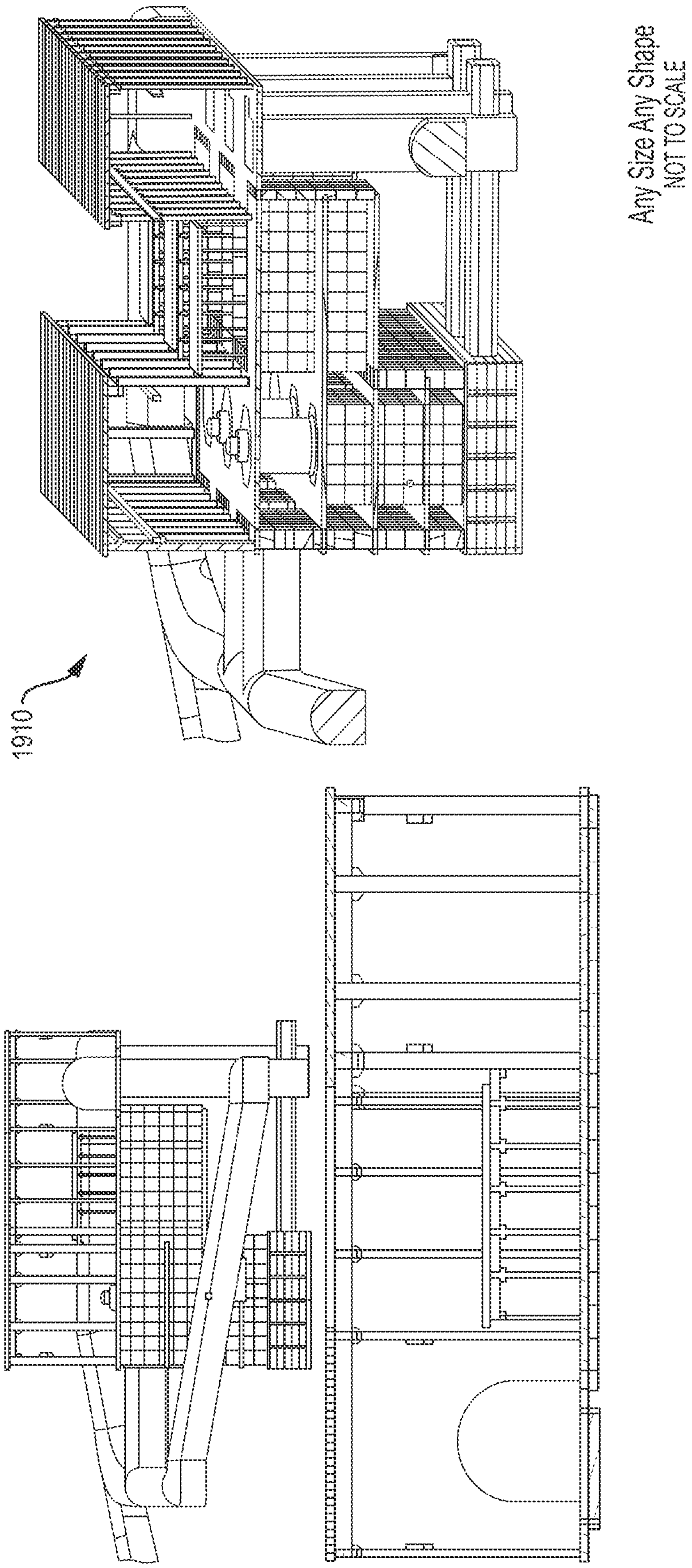
FIG. 19 shows an example embodiment of a powerhouse configured to be at a cavernous subterranean location underground.

FIG. 19 shows an example embodiment of a powerhouse 1910 configured to be at a cavernous subterranean location underground.

Figure 20:
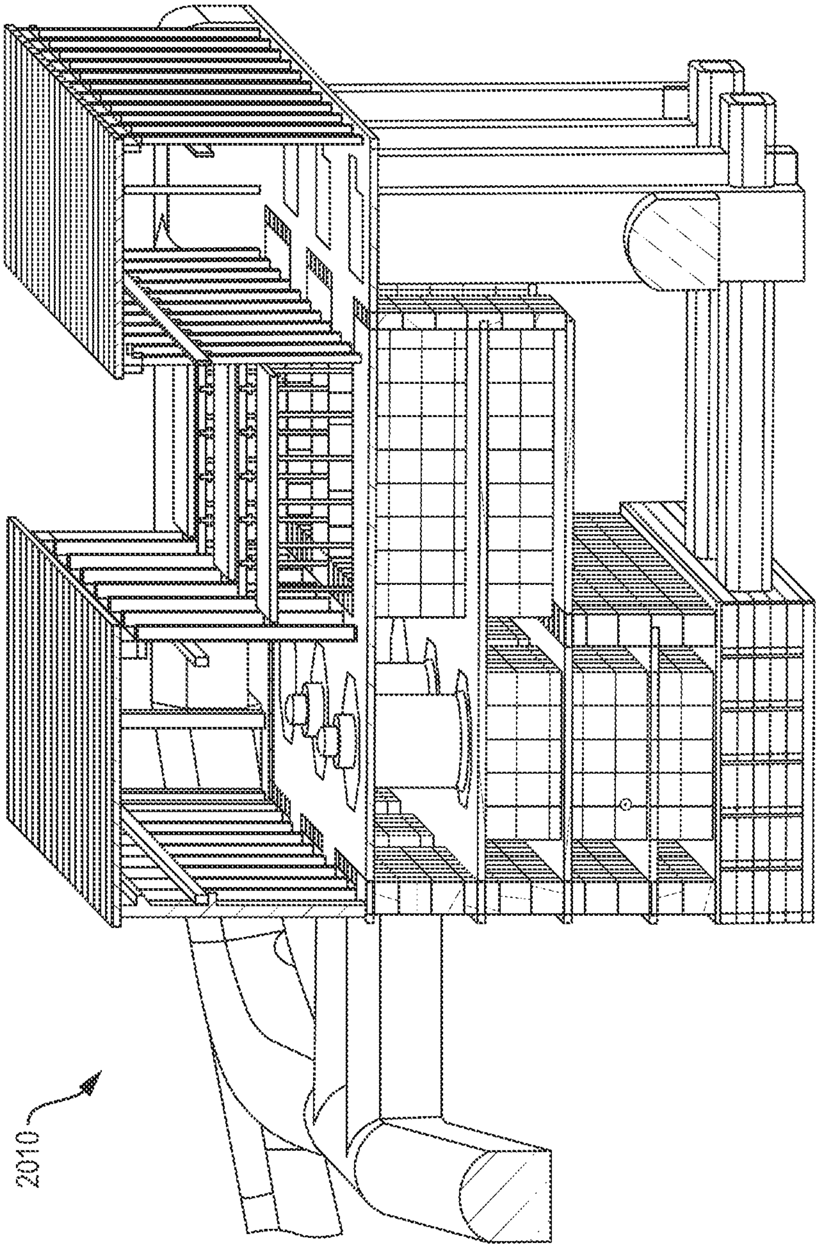
FIG. 20 shows an example embodiment of a powerhouse configured to be at a cavernous subterranean location underground.

FIG. 20 shows an example embodiment of a powerhouse 2010 configured to be at a cavernous subterranean location underground.

Figure 21:
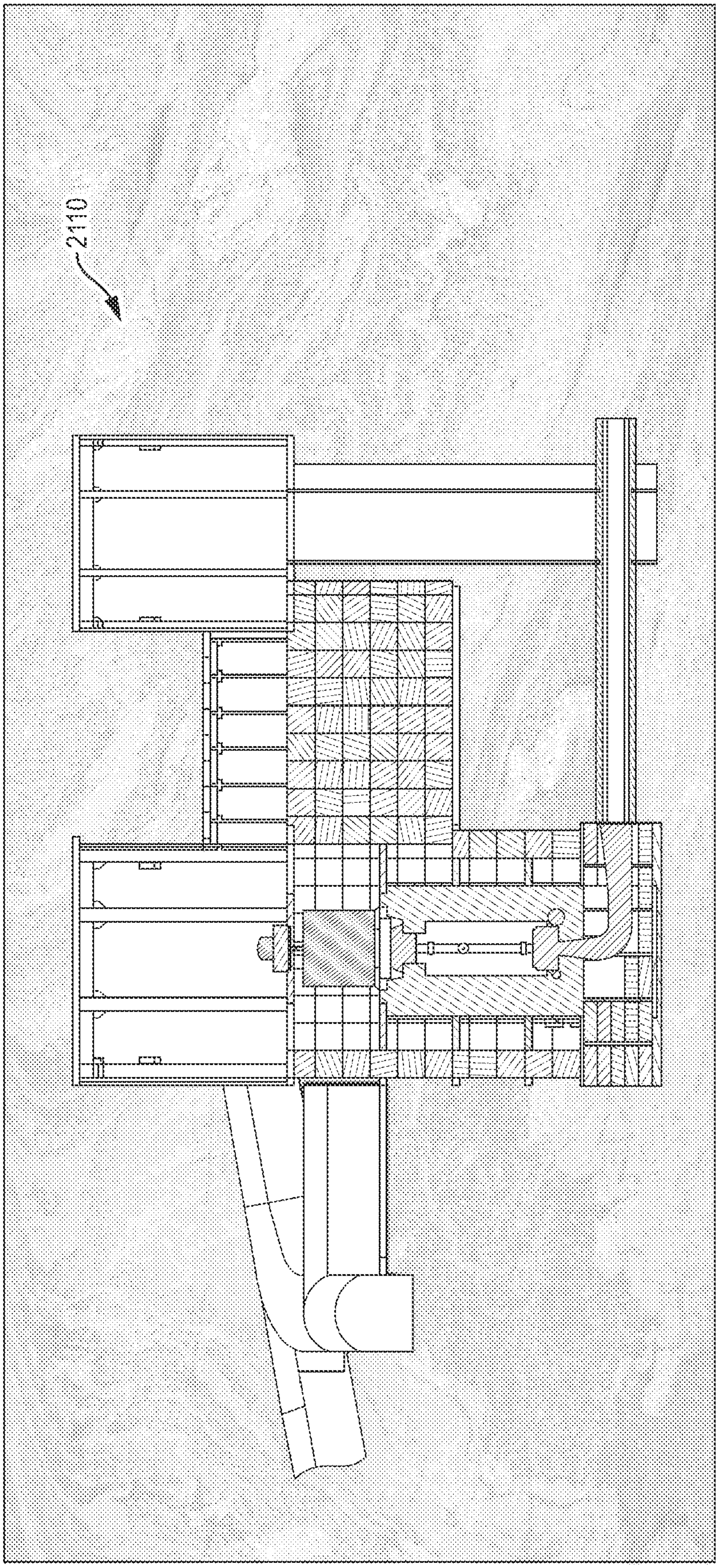
FIG. 21 shows an example embodiment of a precast powerhouse configured to be at a cavernous subterranean location underground.

FIG. 21 shows an example embodiment of a precast powerhouse 2110 configured to be at a cavernous subterranean location underground.

Figure 22:
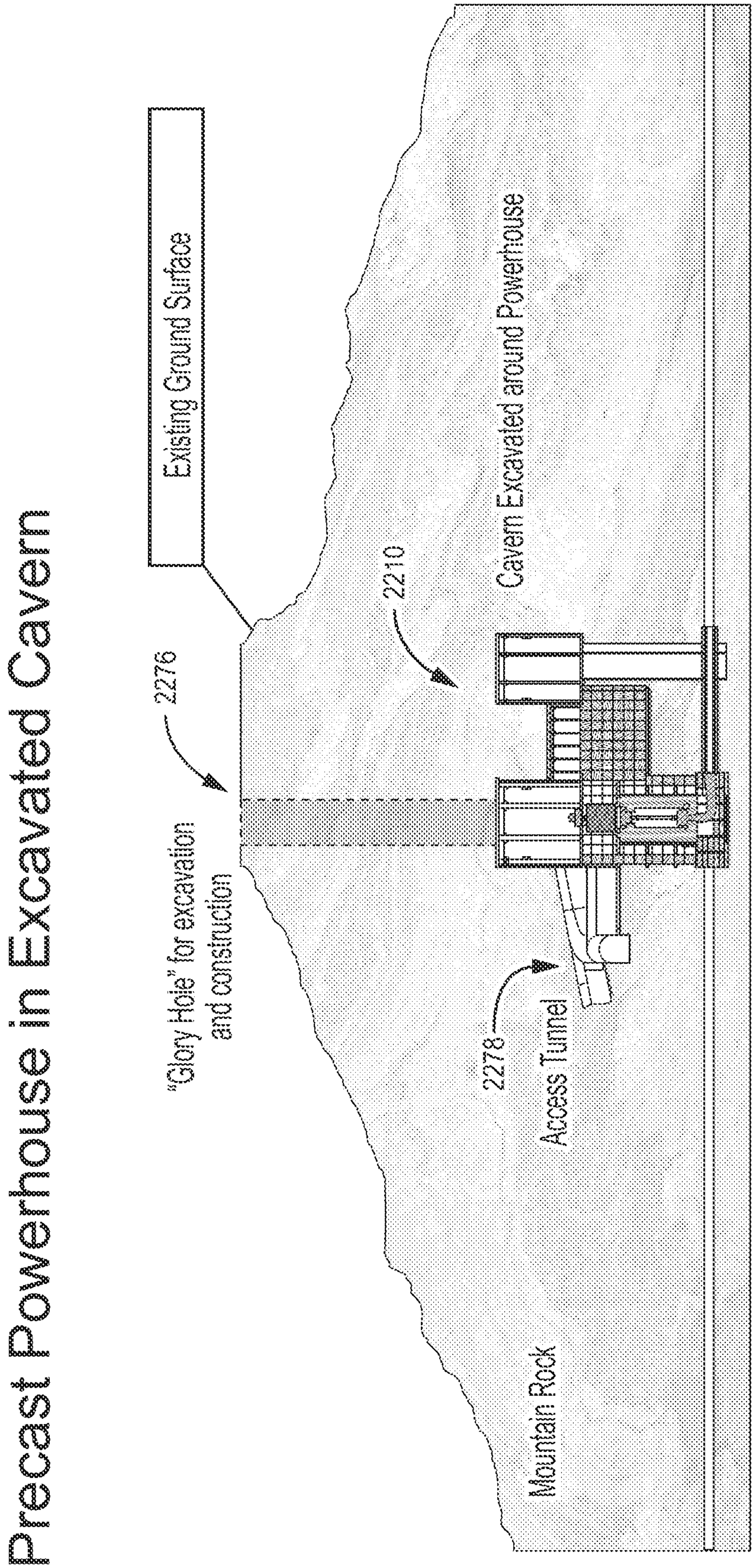
FIG. 22 shows an example embodiment of a precast powerhouse in an excavated cavern.

FIG. 22 shows an example embodiment of a precast powerhouse 2210 in an excavated cavern. In some example embodiments, such as the one shown in FIG. 22, an access tunnel 2278 may facilitate access to the powerhouse. In some example embodiments, such as the one shown in FIG. 22, a hole 2276 above the powerhouse may facilitate access to the powerhouse. In some example embodiments, the hole is part of a channel to the powerhouse. In some example embodiments, a man-made structure (e.g., tube) may fit inside the channel to facilitate access to the powerhouse.

Figure 23:
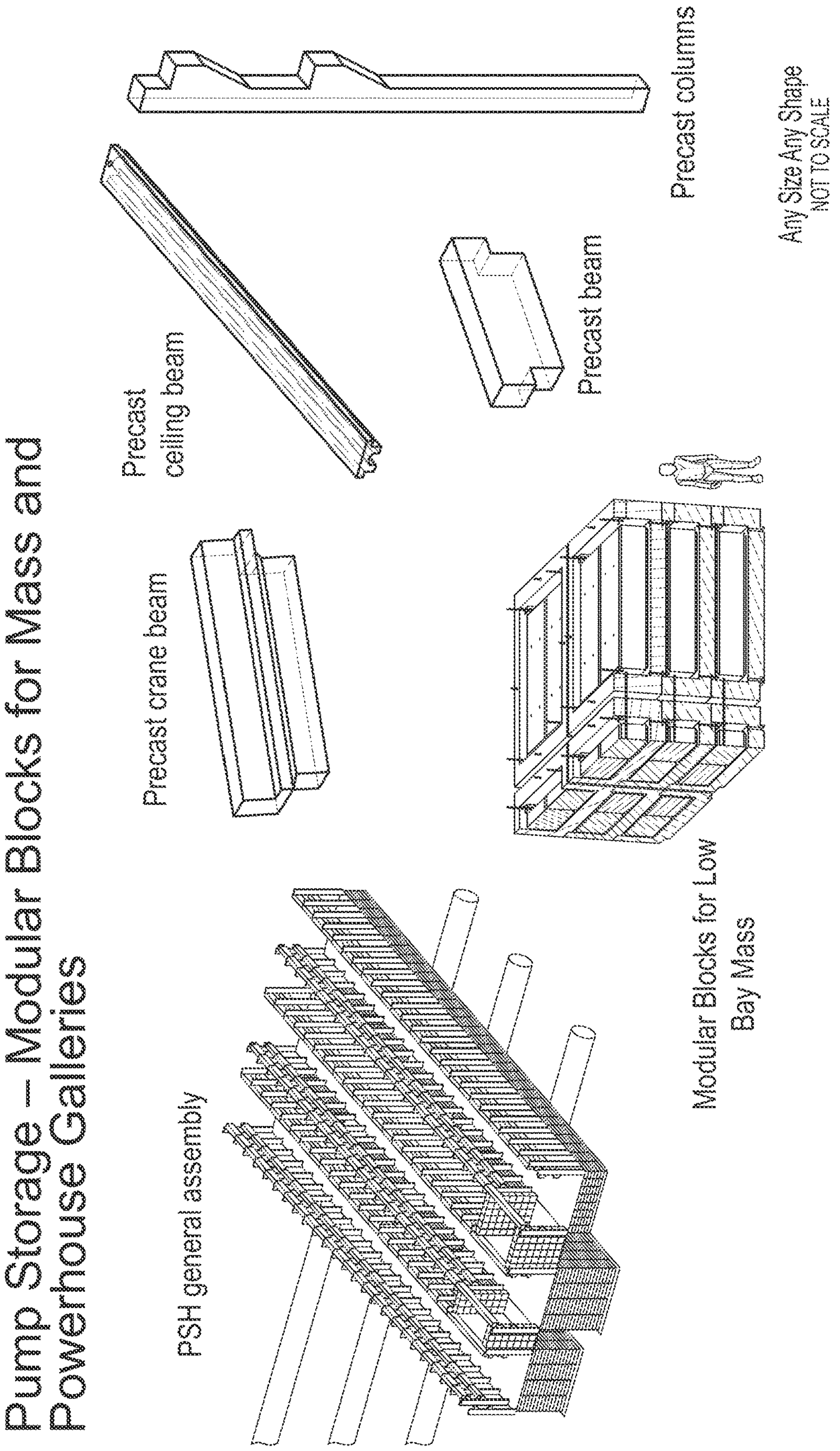
FIG. 23 shows example embodiments of modular blocks for mass and powerhouse galleries.

FIG. 23 shows example embodiments of modular blocks for mass and powerhouse galleries.

Figure 24A:
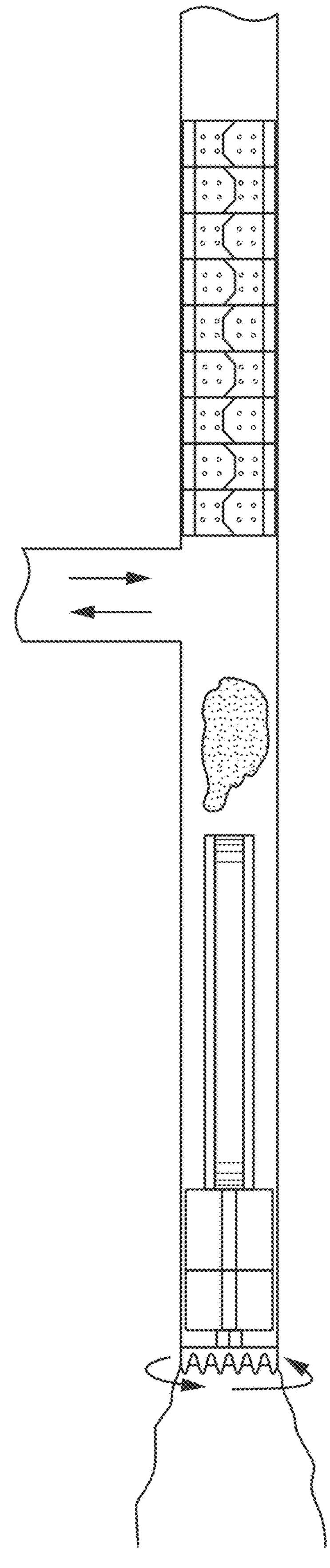
FIG. 24A shows an example embodiment of a water storage tunnel.
Figure 24D:
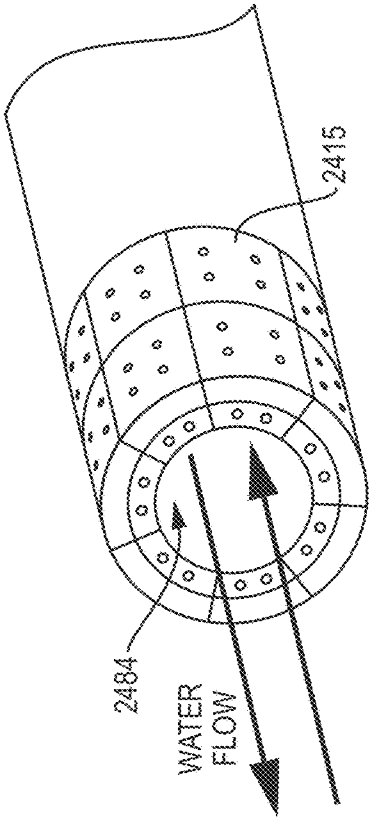
FIG. 24D shows a perspective view of an example embodiment of a water storage tunnel.
Figure 24C:
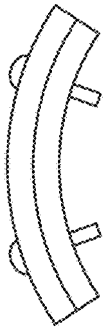
FIG. 24C shows a side view of an example embodiment of a tunnel precast module.
Figure 24B:
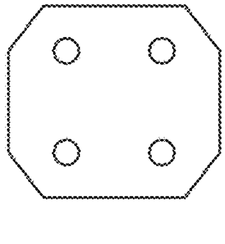
FIG. 24B shows a top view of an example embodiment of a tunnel precast module.

FIGS. 24A-D show an example embodiment of a water storage tunnel 2484. In various embodiments, a tunnel may be constructed with precast components 2415. A tunnel may be constructed (FIG. 24A) to allow for underground transmission lines. FIG. 24A illustrates use of a tunnel boring machine that employs circular cutting to excavate earth to form a tunnel and use of a conveyor belt to move soil to a soil deposit area. In various embodiments, underground tunnels may comprise rails to transport material. In various embodiments, underground tunnels may be accessible via one or more access points at a surface. In various embodiments, one or more or the one or more access points may be covered using rubberized manhole covers. FIG. 24B shows that a tunnel wall is strengthened with precast modules after the tunnel boring machine of FIG. 24A has completed its work. FIGS. 24C and 24D shows top and side views, respectively, of a precast segment that has rock bolts that extend from the precast segment to a solid underground formation, such as bedrock, to secure the precast segment in place. FIG. 24D shows a completed structure defining the tunnel 2484 used, for example, to water flow.

Fluid may be pumped from a lower position to a higher position using a local power source. In various embodiments, the local power source may be solar, geothermal, nuclear, wind, gasoline, biomass, or any other suitable power source.

Figure 25:
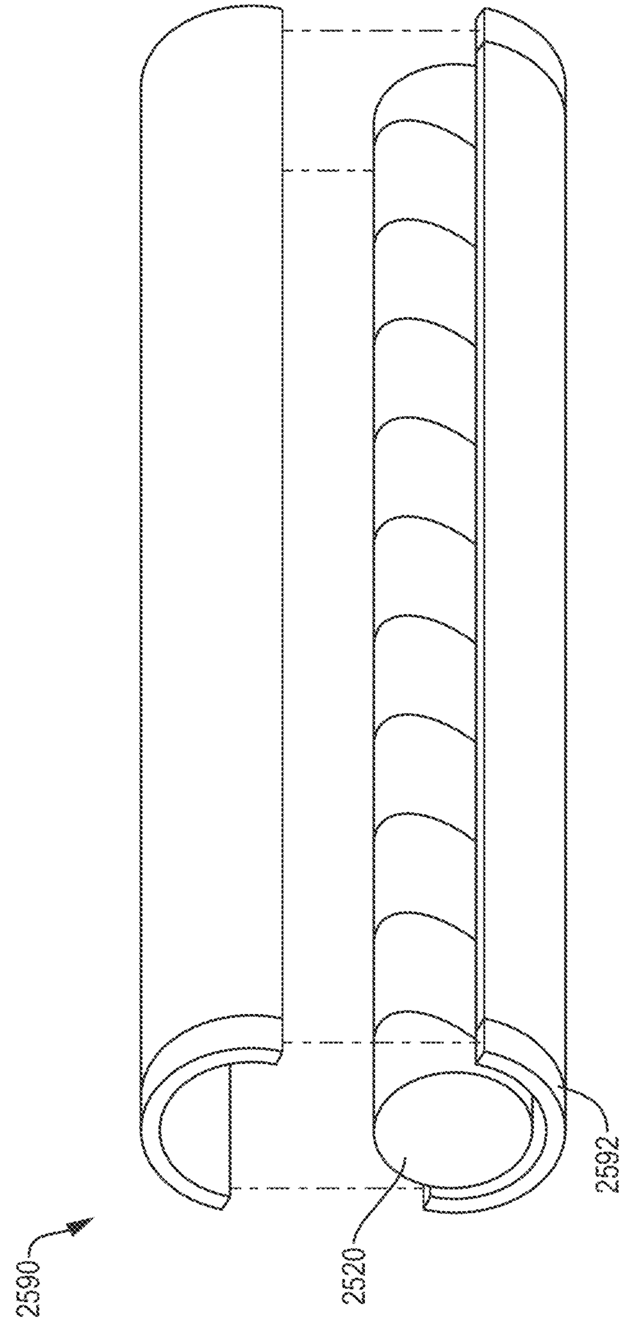
FIG. 25 shows an example embodiment of a seismic relief fluid conduit system.

FIG. 25 shows an example embodiment of a seismic relief fluid conduit system 2590. In various embodiments, such as the one shown in FIG. 25, the seismic relief fluid conduit system 2590 may comprise a base holder 2592, a fluid conduit 2520, and fill material. The base holder 2592 may comprise an inner diameter greater than the outer diameter of a fluid conduit 2520. In various embodiments, the base holder 2592 may be configured to surround at least a portion of the fluid conduit 2520. In some example embodiments, the base holder 2592 surrounds a portion of the fluid conduit 2520 along the direction of extension of the fluid conduit 2520. In various embodiments, the base holder 2592 surrounds all of the fluid conduit 2520. In various embodiments, the base holder 2592 surrounds a portion of each cross-section of the fluid conduit 2520.

The seismic relief fluid conduit system 2590 may comprise fill material positioned between the inner diameter of the base holder 2592 and the outer diameter of the fluid conduit 2520. The fillable material could be any material suitable for absorbing seismic waves. In various embodiments, the fillable material may comprise soft earth material, for example, soil, rocks, etc.

In the embodiment shown in FIG. 25, the base holder 2492 has a circular cross-section. In alternative embodiments, the cross-section of the base holder 2492 may have a different shape. In various embodiments, the base holder 2492 may be constructed using one or more precast segments.

Figure 26A:
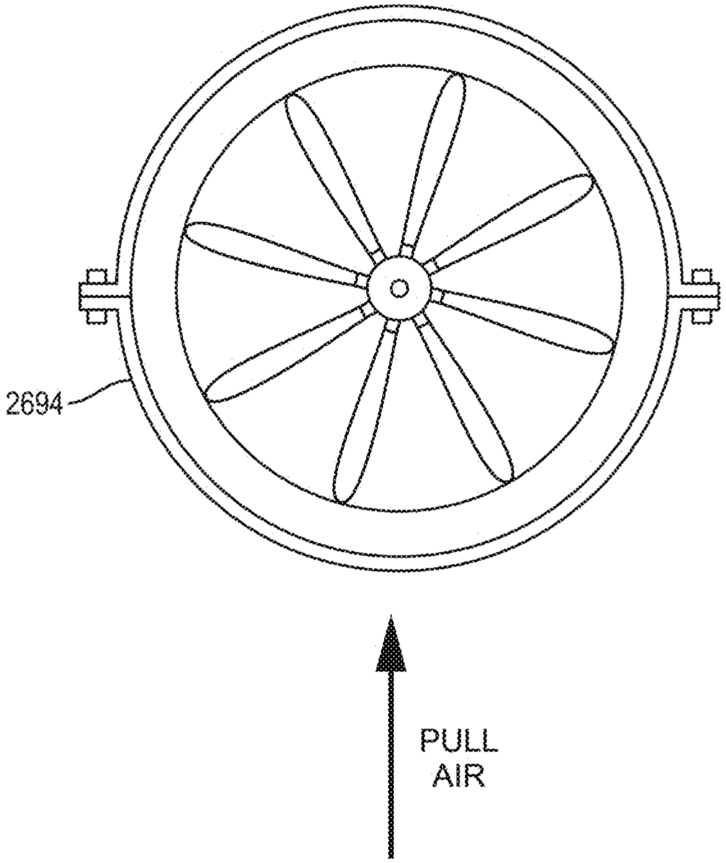
FIG. 26A shows an example of a fan configured to provide suction to pull fluid to the upper impoundment structure.
Figure 26B:
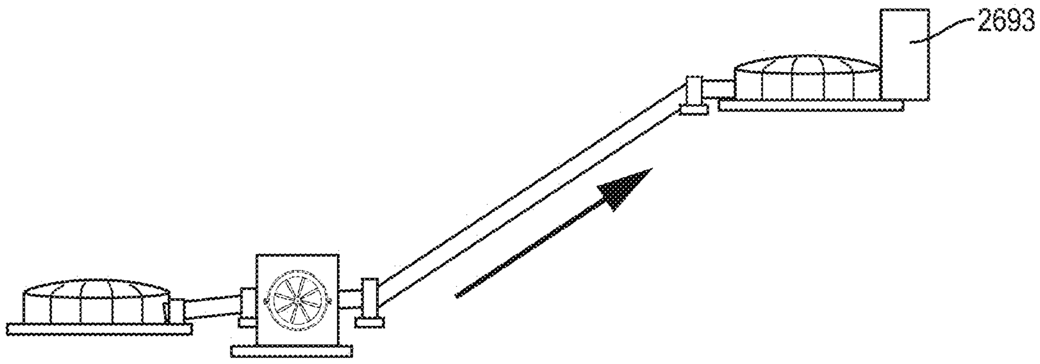
FIG. 26B shows an example configuration for pulling fluid to an upper impoundment structure.

FIGS. 26A-26B show example configurations for pulling fluid to an upper impoundment structure. In various embodiments, pump storage system comprises a vacuum house 2693. In various embodiments, the vacuum house 2693 comprises at least fan 2694 (see FIG. 26A) configured to provide suction to pull fluid to the upper impoundment structure. The speed of at least one of the at least one fan 2694 may be adjusted to adjust the fluid flow speed. In various embodiments, the vacuum house 2693 may be positioned at a height that is different than the height shown in FIG. 26B.

Figure 27:
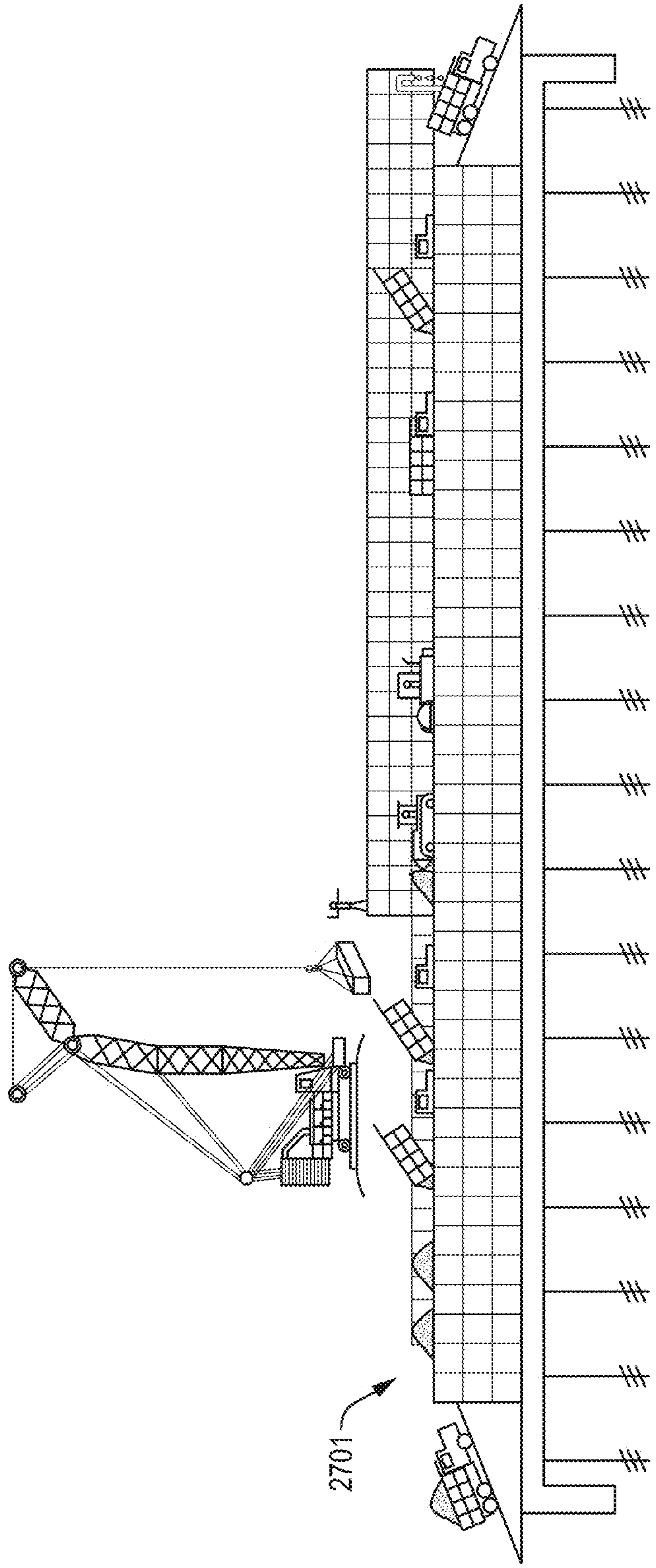
FIG. 27 shows an example of an assembly of an example embodiment of an impoundment structure.

FIG. 27 shows an example of an assembly of an example embodiment of an impoundment structure 2701. The impoundment structure could be an upper impoundment structure, a lower impoundment structure, or an intermediate height impoundment structure. In some example embodiments, assembly includes securing a position of a working platform. In some example embodiments, assembly includes securing one or more precast segments to the working platform using one or more connectors. In some example embodiments, a precast segment is secured to a working platform using one or more bolts. In some example embodiments, one or more precast segments are secured together using any suitable means, including means described herein. In some example embodiments, one or more precast infill blocks are secured to a precast form using any suitable means, including means described herein.

Figure 28:
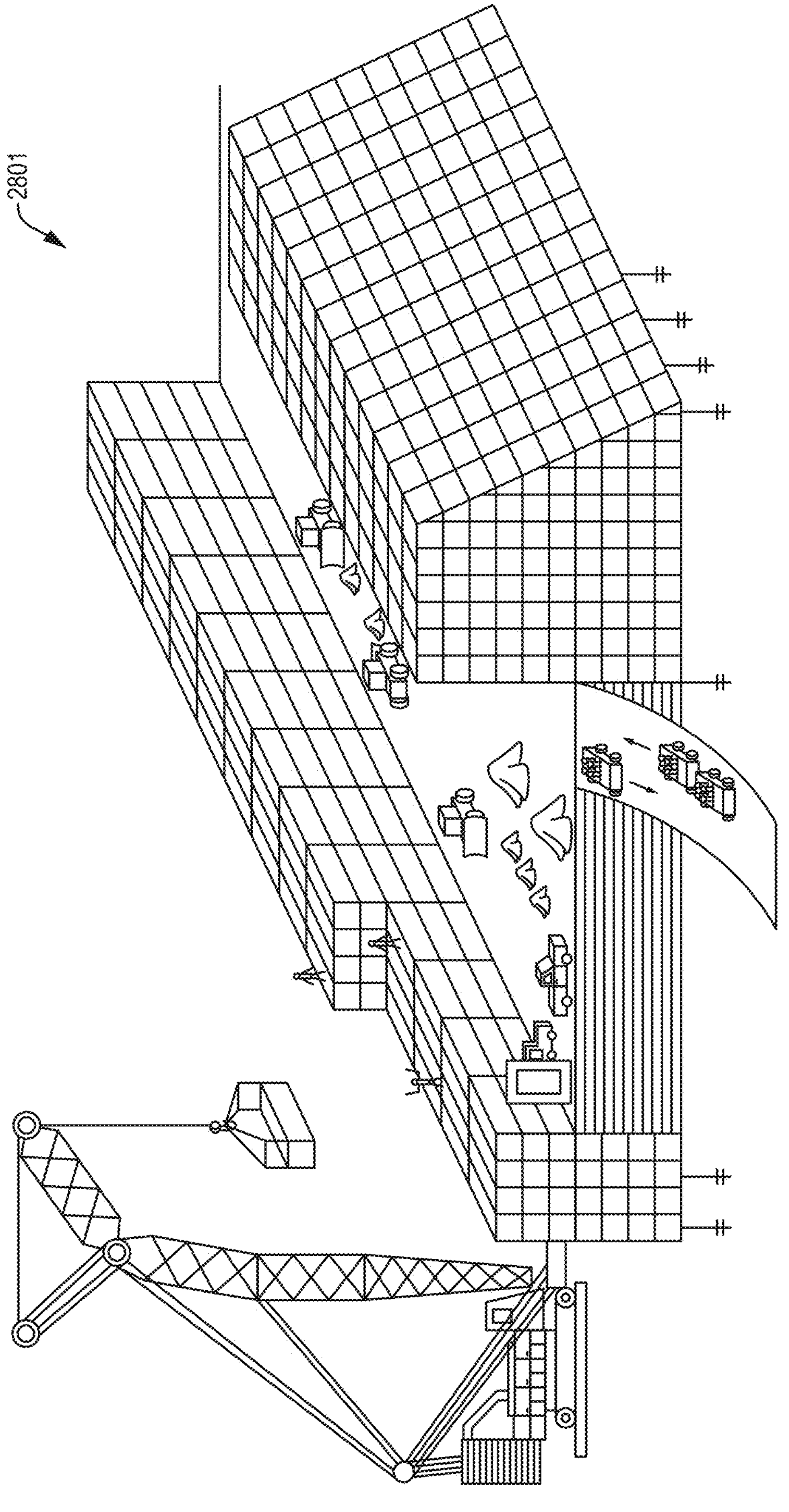
FIG. 28 shows an example of an assembly of an example embodiment of an impoundment structure.

FIG. 28 shows an example of an assembly of an example embodiment of an impoundment structure 2801. The impoundment structure could be an upper impoundment structure, a lower impoundment structure, or an intermediate height impoundment structure.

Figure 29:
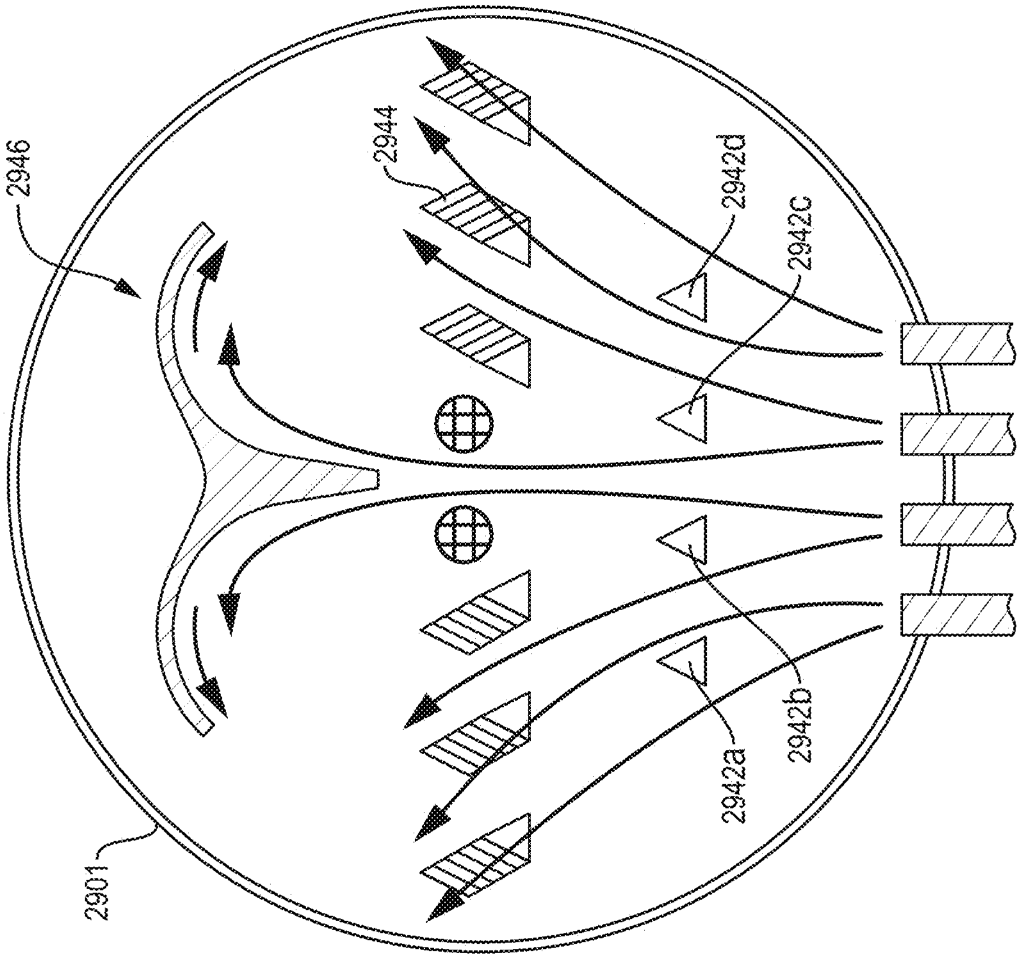
FIG. 29 shows an example embodiment of an impoundment structure comprising energy dissipation elements (also referred to as diffusers).

FIG. 29 shows an example embodiment of an impoundment structure 2901 comprising energy dissipation elements (also referred to as diffusers). The impoundment structure could be an upper impoundment structure, a lower impoundment structure, or an intermediate height impoundment structure.

In various embodiments, such as the one shown in FIG. 29, the impoundment structure 2901 may comprise at least one diffuser 2942 configured to reduce the velocity and/or redirect the flow of fluid in the impoundment structure. In the embodiment shown in FIG. 29, the impoundment structure 2901 comprises four triangular shaped diffusers 2942*a*-2942*d* arranged in a row. In alternative embodiments, there may be a different number of diffusers. In alternative embodiments, one or more of the diffusers may be shaped differently. In alternative embodiments, one of more of the diffusers may be arranged in a different position and/or orientation. In various embodiments, one or more of the diffusers may comprise precast material or neoprene.

In various embodiments, such as the one shown in FIG. 29, the impoundment structure 2901 may comprise at least one rudder 2944 configured to redirect the flow of fluid. In various embodiments, one or more or the rudders may be hydraulic rudders. In the embodiment shown in FIG. 29, the impoundment structure 2901 comprises six triangular shaped rudders arranged in a row. In alternative embodiments, there may be a different number of rudders. In alternative embodiments, one or more of the rudders may be shaped differently. In alternative embodiments, one of more of the rudders may be arranged in a different position and/or orientation. One or more of the rudders may be controlled independent of the others. In some instances, one or more of the rudders may adjust their position/orientation based on flow conditions. In some instances, one or more of the rudders may adjust their position/orientation based on operator control input. In some instances, one or more of the rudders may adjust their position/orientation based on predetermined configuration settings. In various embodiments, one or more of the rudders may rotate every hour to change water pressure on the walls of the impoundment structure.

In various embodiments, such as the one shown in FIG. 29, the impoundment structure 2901 may comprise a modular water deflector 2946 configured to redirect the flow of fluid. The embodiment shown in FIG. 29 comprises one modular water deflector 2946. Alternative embodiments may comprise a different number of modular water deflectors. In alternative embodiments, the modular water deflector may be positioned and/or arranged and/or shaped differently. In alternative embodiments, the modular water deflector may comprise a different radius of curvature. In various embodiments, the modular water deflector may comprise a first radius of curvature on one side and a second, different, radius of curvature on a second side. In various embodiments, the modular water deflector may comprise the same radius of curvature on each side.

In various embodiments, the impoundment structure may comprise a solar heating system. In various embodiments, an impoundment structure with one or more of the characteristics described in connection with FIG. 29 may be constructed using precast segments.

Figure 30:
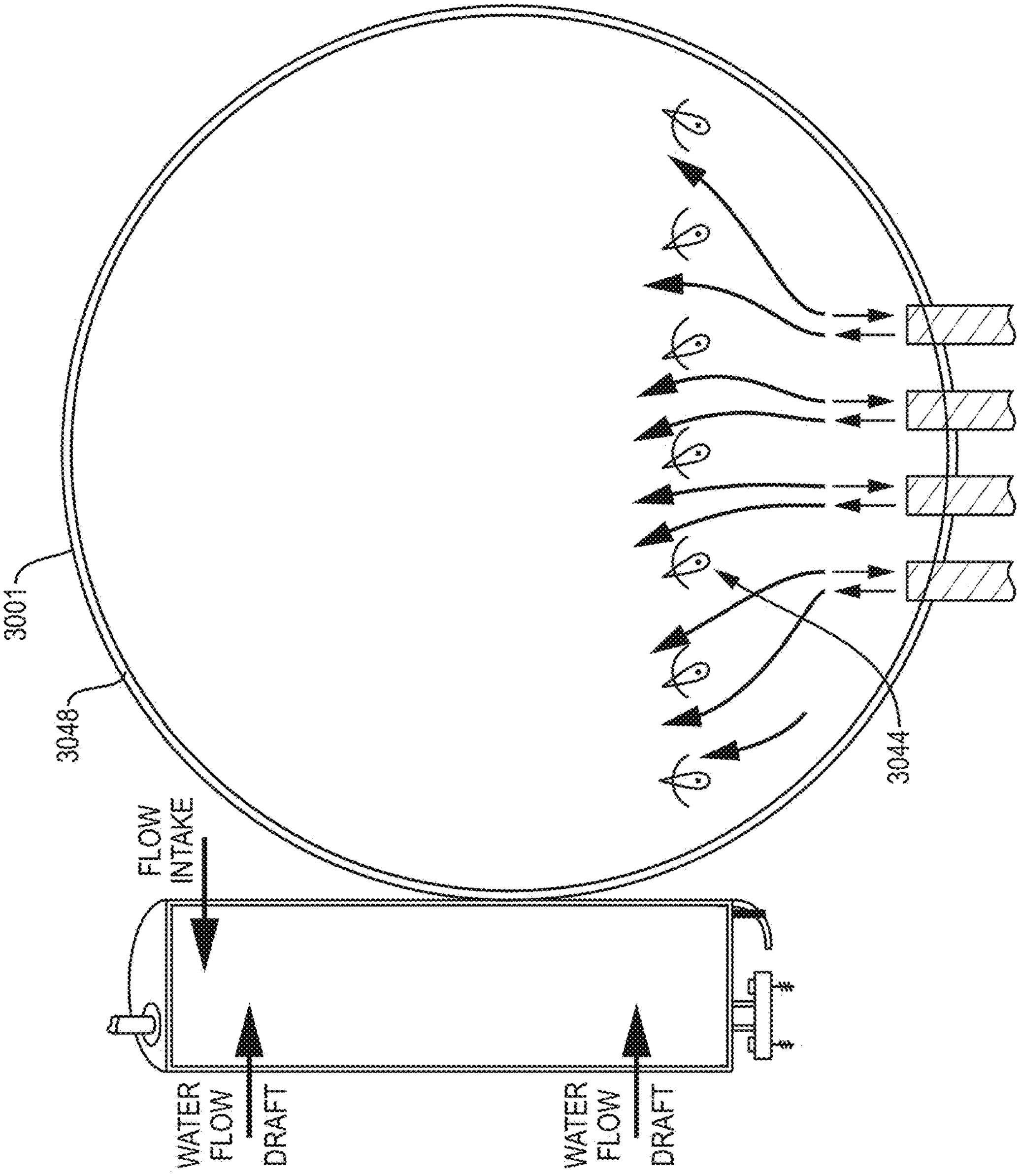
FIG. 30 shows an example embodiment of an impoundment structure or tank comprising energy dissipation elements.

FIG. 30 shows an example embodiment of an impoundment structure or tank 3001 comprising energy dissipation elements. The impoundment structure or tank could be an upper impoundment structure or tank, a lower impoundment structure or tank, or an intermediate height impoundment structure or tank.

In various embodiments, such as the one shown in FIG. 30, the impoundment structure or tank 3001 comprises at least one flow control rudder and/or gate 3044 configured to direct the flow of fluid. The rudders and/or gates may be automated in view of conditions or may be directly controlled by an operator. The rudders and/or gates may be different shapes, sizes, or orientations. The rudders and/or gates may be arranged differently than the arrangement shown in FIG. 30.

In various embodiments, impoundment structure or tank may comprise a protective inner shock and cushion system 3048. In various embodiments, the shock and cushion system may comprise a baffle wall.

Figure 31:
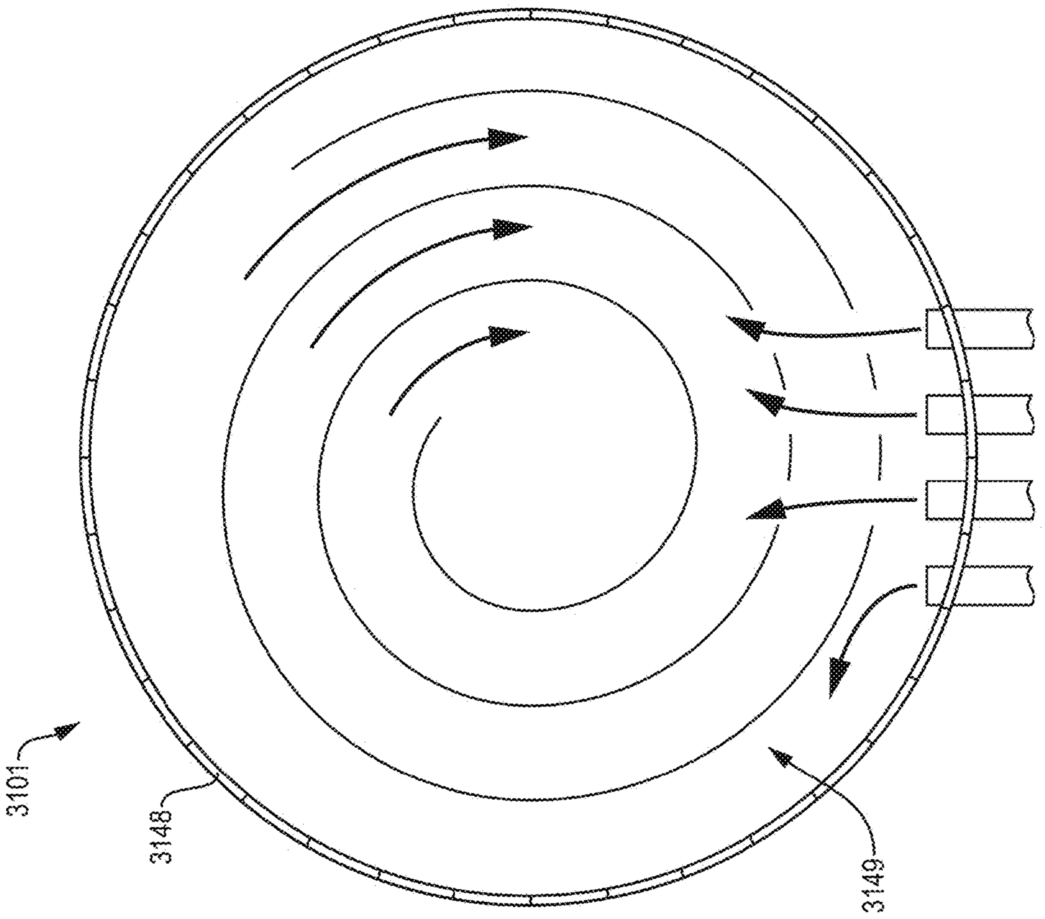
FIG. 31 shows an example embodiment of an impoundment structure or tank comprising energy dissipation elements.

FIG. 31 shows an embodiment of an impoundment structure or tank 3101 comprising energy dissipation elements. The impoundment structure or tank could be an upper impoundment structure or tank, a lower impoundment structure or tank, or an intermediate height impoundment structure or tank. In various embodiments, such as the one shown in FIG. 31, the impoundment structure or tank 3101 comprises at least one flow control gate 3149 configured to direct the flow of fluid. The gates may be automated in view of conditions or may be directly controlled by an operator. The gates may be different shapes, sizes, or orientations. The gates may be arranged differently than the arrangement shown in FIG. 31. In various embodiments, such as the one shown in FIG. 31, the gates 3149 may be arranged in a circular pattern at different radial positions relative to the center of the impoundment structure inner cavity. In various embodiments, the gates 3149 comprise different access points for water flowing at one radial distance to flow into a channel at a different radial distance. In various embodiments, control of these gates access points may or may not be automated. In various embodiments, the impoundment structure may comprise one or more features described herein.

In various embodiments, impoundment structure or tank may comprise a protective inner shock and cushion system. In various embodiments, the shock and cushion system may comprise a baffle wall.

Figure 32:
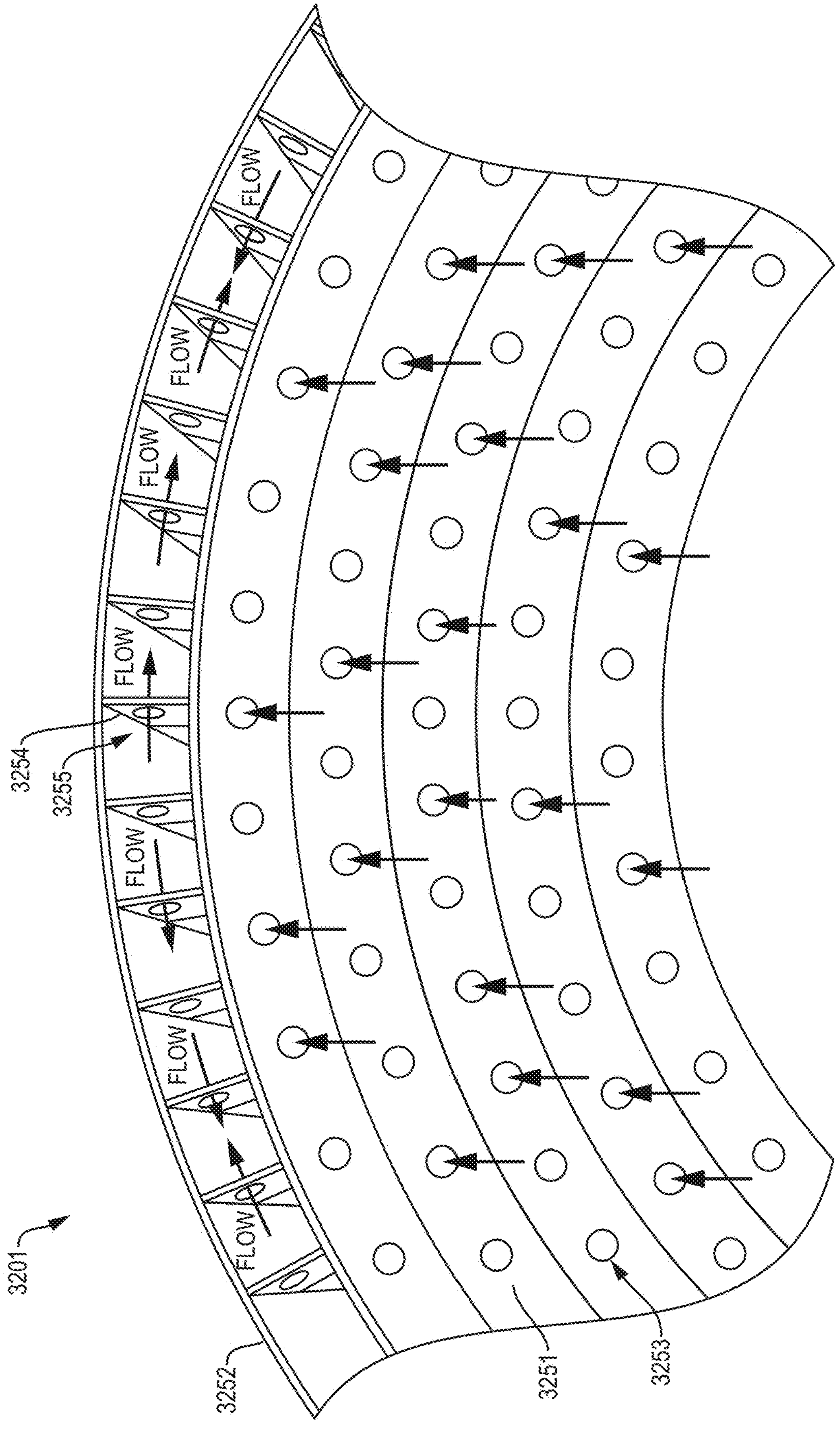
FIG. 32 shows an example embodiment of an impoundment structure comprising energy dissipation elements.

FIG. 32 shows an embodiment of an impoundment structure 3201 comprising energy dissipation elements. The impoundment structure could be an upper impoundment structure, a lower impoundment structure, or an intermediate height impoundment structure.

As shown in FIG. 32, at least a portion of the impoundment structure 3201 may comprise an inner wall 3251 defining at least one aperture 3254. Fluid flowing in the impoundment structure may pass through at least one of the at least one aperture. A portion of the fluid is configured to flow between the inner wall 3251 and an outer wall 3252 of the impoundment structure 3201. The fluid flowing along the perimeter of the impoundment structure between the inner wall 3251 and the outer wall 3252 may reduce the pressure of fluid flow at an inner surface of the outer wall 3252.

In various embodiments, such as the one shown in FIG. 32, the impoundment structure 1701 comprises multiple supports 1754 positioned between the inner surface of the outer wall 3252 and the inner wall 3251. The supports 3254 each comprise at least one aperture 3255 constructed and arranged to allow fluid flow between the inner surface of the outer wall 3252 and the inner wall 3251.

In various embodiments, such as the one shown in FIG. 32, the apertures of the inner wall are circular. In alternative embodiments, at least one of the at least one aperture may comprise a different shape.

In various embodiments, such as the one shown in FIG. 32, the apertures of the inner wall are the same size. In alternative embodiments, at least one of the at least one aperture may comprise a different size.

In various embodiments, such as the one shown in FIG. 32, the apertures of the supports are circular. In alternative embodiments, at least one of the apertures of at least one of the supports may comprise a different shape.

In various embodiments, such as the one shown in FIG. 32, the apertures of the supports are the same size. In alternative embodiments, at least one of the apertures of at least one supports may comprise a different size.

In various embodiments, each support may comprise more than one aperture. In various embodiments, each support may comprise more than one aperture, each aperture being at a different height.

In various embodiments, the inner wall is configured to flex in response to water pressure.

In various embodiments, the impoundment structure may comprise multiple walls comprising the characteristics described in connection with the inner wall of FIG. 32. In such embodiments, water may flow between each one of the multiple walls to reduce the pressure of water flow along an outward direction (relative to the center of the impoundment structure). In various embodiments at least one of the walls of the impoundment structure may be configured to rotate.

Figure 33:
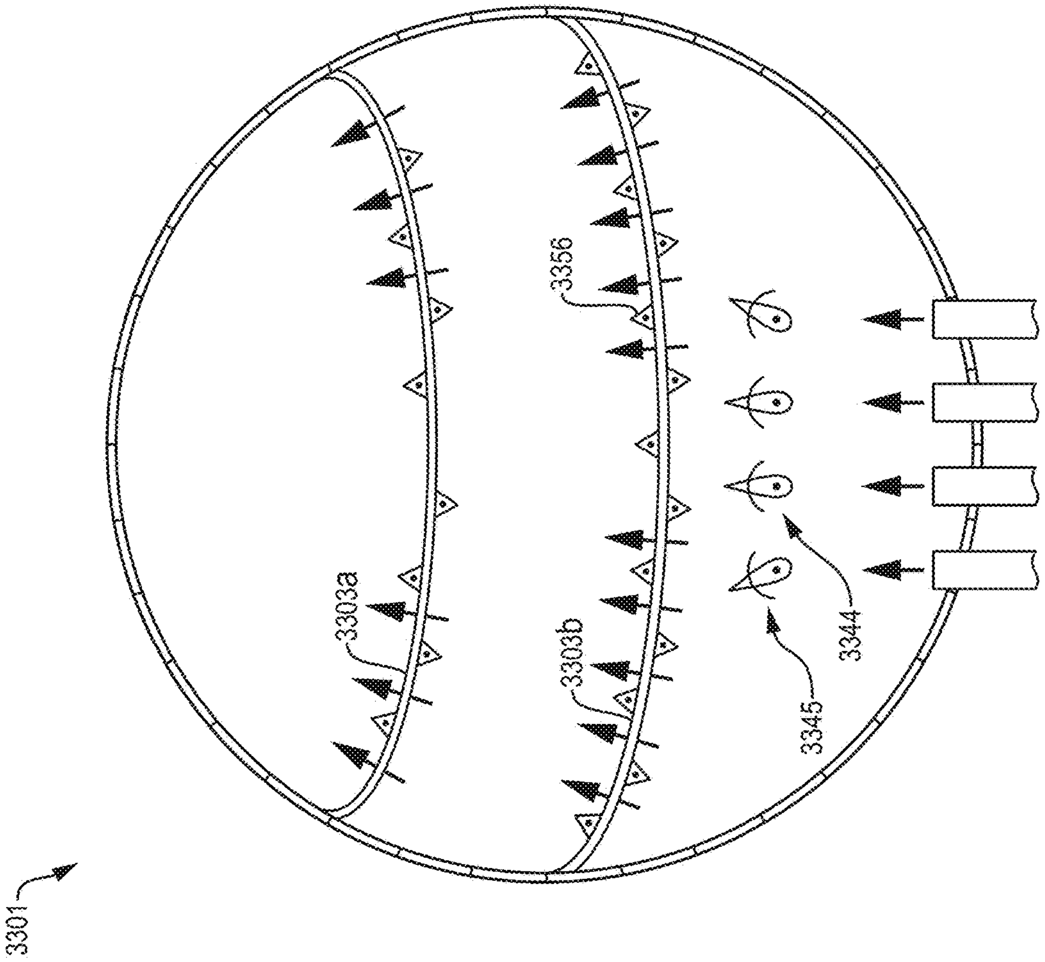
FIG. 33 shows an example embodiment of an impoundment structure or tank comprising energy dissipation elements.

FIG. 33 shows an embodiment of an impoundment structure or tank 3301 comprising energy dissipation elements. The impoundment structure or tank could be an upper impoundment structure or tank, a lower impoundment structure or tank, or an intermediate height impoundment structure or tank.

In various embodiments, the impoundment or tank may comprise one or more baffle walls 3303 configured to reduce the water pressure at an outer wall. The embodiment shown in FIG. 33, the impoundment structure 3301 comprises two baffle walls 3303*a*, 3303*b*. Alternative embodiments may comprise a different number of baffle walls. In alternative embodiments, the configuration of the baffle walls may be different, for example, rather than curving toward a front end of the impoundment structure (relative to the fluid conduits), the baffle walls may be curved in a different direction. Alternatively, one or more of the baffle walls may not be curved. At least one of the baffle walls may be configured to flex.

In various embodiments, at least one of the at least one baffle wall may comprise one or more protrusions 3356. In various embodiments, at least one of the protrusions may define port holes. In the embodiment shown in FIG. 33, the protrusions are at both sides of each baffle wall. In alternative embodiments, the protrusions may be on only one side of the baffle wall.

In various embodiments, such as the one shown in FIG. 33, the impoundment structure or tank 3301 may comprise rudders 3344 as previously described. In various embodiments, the impoundment structure 3301 may comprise at least one swing guide 3345 with at least one of the rudders 3344.

In various embodiments, such as the one shown in FIG. 33, the impoundment structure may comprise baffled walls near the outer wall, as previously described.

Figure 34:
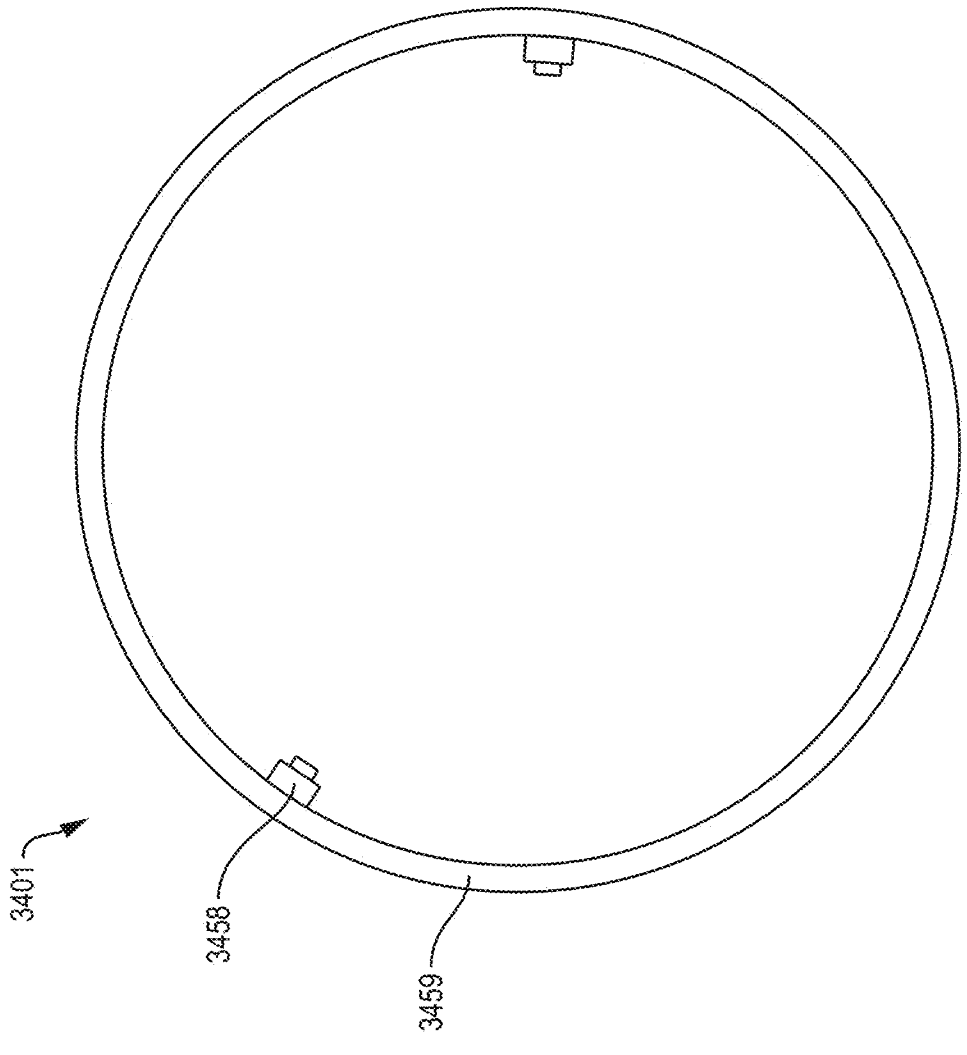
FIG. 34 shows an example embodiment of an impoundment structure comprising a sensor system configured to monitor conditions in the impoundment structure.

FIG. 34 shows an embodiment of an impoundment structure 3401 comprising a sensor system configured to monitor conditions in the impoundment structure 3401. In various embodiments, one or more sensors 3458 are arranged on a track 3459 and travel to various positions near the edge of the impoundment structure 3401 to monitor water flow and/or damage to walls of the impoundment structure 3401. In alternative embodiments, the sensors may not be on a track. In various embodiments, one or more sensors may monitor turbine activity. Such sensors may operate automatically based on predetermined configurations or may operate based on user control in real-time.

Figures 35A, 35B, 35C, 35D:
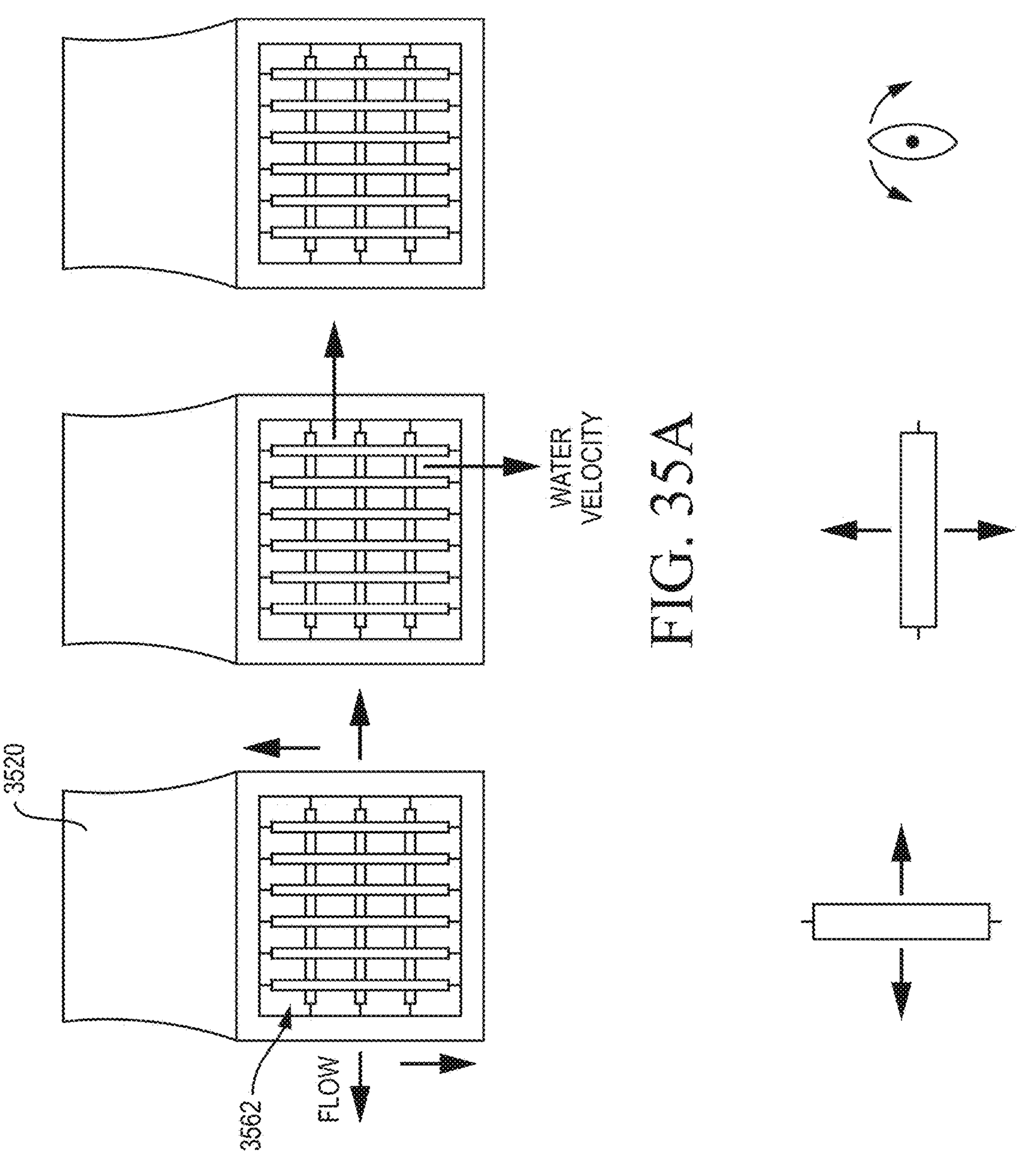
FIG. 35A shows an example embodiment of tube gates at fluid conduits.
FIG. 35B is a side view of an example embodiment of gates configured to translate in the direction of the arrows.
FIG. 35C is a side view of an example embodiment of gates configured to translate in the direction of the arrows.
FIG. 35D is a top view of an example embodiment of gates configured to translate in the direction of the arrows.

FIG. 35A shows an example embodiment of tube gates 3562 at fluid conduits 3520. The tube gates 3562 may be configured to redirect flow of fluid and/or reduce the velocity of the fluid. The fluid gates may be automated or controlled by an operator. The fluid gates may be configured to direct the fluid flow evenly or not evenly. The fluid gates may be automated based on characteristics of fluid flow.

In the embodiment shown in FIG. 35A, the fluid gates 3562 are on each fluid conduit 3520. In alternative embodiments, the fluid gates may not be on each fluid conduit.

In the embodiment shown in FIG. 35A, the fluid gates 3562 are arranged in an orthogonal pattern aligned with a vertical and horizonal orientation. In alternative embodiments, the fluid gates may be arranged orthogonally, but at an angle relative to vertical and horizontal axes. In alternative embodiments, the fluid gates may not be arranged in an orthogonal pattern. In alternative embodiments, at least a portion of at least one gate may be curved. The fluid gates may be configured to rotate about their elongated axis. The fluid gates may be configured to translate in a plane orthogonal to the direction of fluid flow. The fluid gates may be configured to reduce or eliminate fluid flow into the impoundment structure or tank.

Figure 36:
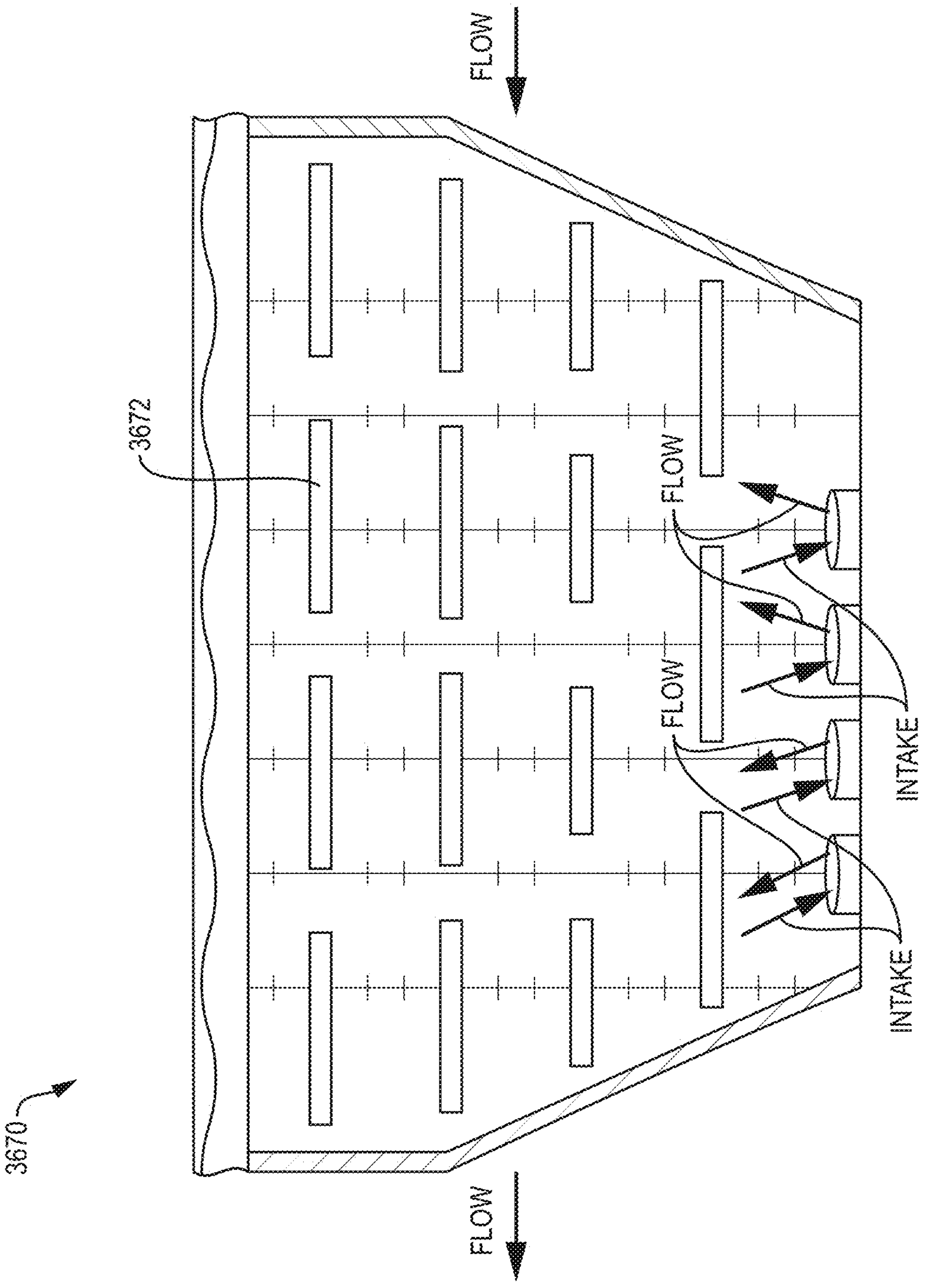
FIG. 36 is an example embodiment of an environmental protective system.

FIG. 36 shows an example embodiment of an environmental protective system 3670. In some embodiments the environmental protective system 3670 comprises multiple barriers 3672 at a natural water impoundment location (e.g., a river, lake, ocean). In alternative embodiments, the environmental protective system may comprise a different number of barriers. In alternative embodiments, the size, shape, and/or arrangement of the barriers may be different.

Example Embodiment 1: A power generation system, comprising: an impoundment structure at least partially defined by a plurality of precast segments, at least one of the precast segments including a precast form and at least one precast infill block.

Example Embodiment 2: The power generation system of Example Embodiment 1 or any other Example Embodiment, wherein the impoundment structure defines an intake or egress configured to receive or output fluid with a fluid supply via a flow path.

Example Embodiment 3: The power generation system of any one of Example Embodiments 1-2 or any other Example Embodiment, further comprising a power generation module configured to pump fluid from the fluid supply and into the impoundment structure via the flow path.

Example Embodiment 4: The power generation system of any one of Example Embodiments 1-3 or any other Example Embodiment, further comprising a power conversion module configured to convert kinetic energy of fluid released from the impoundment structure and travelling through the flow path into electric energy.

Example Embodiment 5: The power generation system of any one of Example Embodiments 1-4 or any other Example Embodiment, wherein the power conversion module includes: an intake support structure configured to support at least one intake tube, the intake tube at least partially defining a flow path, the intake support structure being at least partially constructed of precast segments; a power generator support structure configured to support weight of a power generator in an arrangement operably disposed within the flow path, the power generator support structure being at least partially constructed of precast segments; and a draft support structure configured to support at least one draft tube, the at least one draft tube at least partially defining the flow path, the draft support structure being at least partially constructed of precast segments positioned above the at least one draft tube.

Example Embodiment 6: The power generation system of any one of Example Embodiments 1-5 or any other Example Embodiment, further comprising a flow path structure coupled to the impoundment structure, the flow path structure at least partially defining the flow path, the flow path structure including at least one precast segment.

Example Embodiment 7: The power generation system of any one of Example Embodiments 1-6 or any other Example Embodiment, wherein the precast infill block is fixedly couped to the precast segment.

Example Embodiment 8: A power generation system, comprising: an impoundment structure, including: a containment wall defining at least a portion of a boundary of a containment volume, the containment volume configured to store a volume of fluid; and at least one inner wall positioned within the containment volume and offset from the containment wall, the at least one inner wall defining at least one aperture.

Example Embodiment 9: The power generation system of Example Embodiment 8 or any other Example Embodiment, wherein the impoundment structure includes at least one precast segment, the at least one precast segment including a precast form and at least one precast infill block.

Example Embodiment 10: The power generation system of any one of Example Embodiments 8-9 or any other Example Embodiment, further comprising one or more supports coupling the containment wall with the inner wall.

Example Embodiment 11: The power generation system of any one of Example Embodiments 8-10 or any other Example Embodiment, wherein one or more of the one or more supports defines at least one aperture configured to allow fluid to pass therethrough.

Example Embodiment 12: The power generation system of any one of Example Embodiments 8-11 or any other Example Embodiment, further comprising at least one energy dissipation element disposed within the impoundment structure, the at least one energy dissipation element being configured to redirect the flow of the pumped fluid entering the impoundment structure.

Example Embodiment 13: The power generation system of any one of Example Embodiments 8-12 or any other Example Embodiment, wherein the at least one energy dissipation element disposed within the impoundment structure causes the flow of the pumped fluid to be redirected to be in a circulating direction between inner wall and outer wall.

Example Embodiment 14: The power generation system of any one of Example Embodiments 8-13 or any other Example Embodiment, wherein the containment wall or the at least one inner wall is at least partially defined by a plurality of precast segments.

Example Embodiment 15: The power generation system of any one of Example Embodiments 8-14 or any other Example Embodiment, wherein at least a subset of the plurality of precast segments are interconnected via complementary coupling elements.

Example Embodiment 16: A power generation system, comprising: a powerhouse, the powerhouse comprising: (1) an intake support structure configured to support at least one intake tube, the intake tube at least partially defining a flow path, the intake support structure being at least partially constructed of precast segments; (2) a power generator support structure configured to support weight of a power generator in an arrangement operably disposed within the flow path, the power generator support structure being at least partially constructed of precast segments; and (3) a draft support structure configured to support at least one draft tube, the at least one draft tube at least partially defining the flow path, the draft support structure being at least partially constructed of precast segments positioned above the at least one draft tube.

Example Embodiment 17: The power generation system of Example Embodiment 16 or any other Example Embodiment, wherein at least one of the precast segments includes a precast form and at least one precast infill block.

Example Embodiment 18: The power generation system of any one of Example Embodiments 16-17 or any other Example Embodiment, further comprising: a stabilization system, the stabilization system including: at least one support structure configured to be positioned below a lower surface of the powerhouse; and an attachment mechanism configured to couple the at least one support structure with the powerhouse.

Example Embodiment 19: A power generation system, comprising: a water intake structure configured to intake fluid and configured for fluid communication with a powerhouse via a flow path, the water intake structure being at least partially constructed of precast segments.

Example Embodiment 20: The power generation system of Example Embodiment 19 or any other Example Embodiment, further comprising a flow path structure configured to facilitate fluid communication between the water intake structure and the powerhouse, a first end of the flow path structure being coupled to the water intake structure and a second end of the flow path structure being coupled to the powerhouse.

Example Embodiment 21: The power generation system of any one of Example Embodiments 19-20 or any other Example Embodiment, wherein the water intake structure comprises one or more layers, each layer including one or more precast segment.

Example Embodiment 22: The power generation system of any one of Example Embodiments 19-21 or any other Example Embodiment, wherein each layer comprises at least one protrusion.

Example Embodiment 23: The power generation system of any one of Example Embodiments 19-22 or any other Example Embodiment, wherein at least one of the precast segments includes a precast form and a precast infill block.

The teachings of all patents, published applications, and references cited herein are incorporated by reference in their entirety.

The features and/or dimensions shown and/or described in this application are not necessarily to scale. Features and/or dimensions may be any size and/or any shape. Example dimensions may be provided herein. In alternative embodiments, one or more of the example dimensions may be different. In some embodiments, one or more characteristics described in connection with an embodiment described or shown herein may be used with any other embodiment described or shown herein.

While example embodiments have been particularly shown and described, it will be understood by those skilled in the art that various changes in form and details may be made therein without departing from the scope of the embodiments encompassed or contemplated herein or in the drawings being filed herewith.

While example embodiments have been particularly shown and described, it will be understood by those skilled in the art that various changes in form and details may be made therein without departing from the scope of the embodiments encompassed by the appended claims.

What is claimed is:

1. A power generation system, comprising:

a powerhouse, comprising:

an intake support structure configured to support at least one intake tube, the intake tube at least partially defining a flow path, the intake support structure being at least partially constructed of precast segments;

a power generator support structure configured to support weight of a power generator in an arrangement operably disposed within the flow path, the power generator support structure being at least partially constructed of precast segments; and a draft support structure configured to support at least one draft tube, the at least one draft tube at least partially defining the flow path, the draft support structure being at least partially constructed of precast segments positioned above the at least one draft tube, a multiple number of the precast segments of the intake support structure, the power generator support structure, and the draft support structure being assembled together, side by side, end to end, and top to bottom.

2. The power generation system of claim 1, wherein at least one of the precast segments includes a precast form and at least one precast infill block.

3. The power generation system of claim 1, further comprising:

a stabilization system, the stabilization system including:

at least one support structure configured to be positioned below a lower surface of the powerhouse; and an attachment mechanism configured to couple the at least one support structure with the powerhouse.

4. The power generation system of claim 1, further comprising an impoundment structure configured to store a volume of fluid at an elevated height above the powerhouse, the impoundment structure being fluidically coupled to the powerhouse and a fluid supply via the flow path, the impoundment structure being at least partially defined by a plurality of precast segments.

5. The power generation system of claim 4, further comprising at least one intake module configured to receive or output fluid with the fluid supply via the flow path.

6. The power generation system of claim 5, further comprising a power generation module configured to pump fluid from the fluid supply and into the impoundment structure via the flow path, convert fluid flowing from the impoundment structure to the fluid supply into electrical power, or both.

7. The power generation system of claim 4, further comprising a flow path structure coupled to the at least one intake module, the flow path structure at least partially defining the flow path, the flow path structure including at least one precast form, segment, or both.

8. The power generation system of claim 4, wherein the system is an open-loop system, and the fluid supply is a natural water supply.

9. The power generation system of claim 4, wherein the system is a closed-loop system and further comprises a second impoundment structure to store a volume of fluid at a height below the powerhouse.

10. The power generation system of claim 1, wherein at least two of the precast segments of the intake support structure, power generator support structure, or draft support structure are arranged in a stacked configuration.

11. The power generation system of claim 1, wherein the intake support structure includes an intake platform, the intake platform being below the at least one intake tube and above at least one of the precast segments of the intake support structure.

12. The power generation system of claim 1, wherein the draft support structure includes a draft platform, the draft platform being above the at least one draft tube and below at least one of the precast segments of the draft support structure.

13. The power generation system of claim 1, wherein at least two of the precast segments of the intake support structure are substantially identical in structure.

14. The power generation system of claim 1, wherein at least three of the precast segments of the draft support structure are substantially identical in structure.

15. The power generation system of claim 2, wherein the at least one precast segment includes a precast form and at least two precast infill blocks.

* * * * *